US006387010B2

(12) United States Patent
Itoh et al.

(10) Patent No.: US 6,387,010 B2

(45) Date of Patent: May 14, 2002

(54) POWER ROLLER UNIT AND OUTPUT DISC UNIT FOR TOROIDAL TYPE CONTINUOUSLY VARIABLE TRANSMISSION

(75) Inventors: Hiroyuki Itoh; Hisashi Machida; Nobuo Goto, all of Fujisawa; Makoto Fujinami, Chiba; Hiroshi Kato, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/822,428

(22) Filed: Apr. 2, 2001

Related U.S. Application Data

(62) Division of application No. 09/277,959, filed on Mar. 29, 1999, now Pat. No. 6,238,318.

(51) Int. Cl.[7] ............................................ F16H 15/38

(52) U.S. Cl. ........................................................ 476/42

(58) Field of Search ............................... 476/8, 10, 40, 476/41, 42, 46

(56) References Cited

U.S. PATENT DOCUMENTS 5,230,258 A * 7/1993 Nakano .................... 476/42 X
5,419,746 A 5/1995 Nakano .................... 476/42 X
5,536,091 A 7/1996 Takata et al. ............. 476/46 X
6,045,481 A * 4/2000 Kumagai .................. 476/42 X
6,244,985 B1 * 6/2001 Wafzig et al. ................ 476/42

FOREIGN PATENT DOCUMENTS

| JP | 62-71465 | 5/1987 |
|---|---|---|
| JP | 1-173552 | 12/1989 |
| JP | 10-30700 | 2/1998 |

* cited by examiner

*Primary Examiner*—Rodney H. Bonck
*Assistant Examiner*—Ankur Parekh
(74) *Attorney, Agent, or Firm*—Miles & Stockbridge P.C.

(57) ABSTRACT

In order to facilitate an assembling operation of a structure which is correctly operated with a proper positional relation, in a power roller unit for a toroidal type continuously variable transmission according to the present invention, a displacement shaft, a power roller, a radial needle bearing, a thrust ball bearing and a thrust needle bearing are pre-assembled to a trunnion. After dimensional relations and operation conditions of the constructural parts of the assembly or unit are ascertained, the assembly is assembled within a housing together with other unit, thereby completing the toroidal type continuously variable transmission.

2 Claims, 23 Drawing Sheets

104
104a
150
118
145
X
146
117
119
R144 R145
D146 R147
144
116
150
149
147

122
104
104a
130
106
107
125
126
131
129
102a
102
112
108
108a
109
120
115
116
117
128
148
121c
129
126
106
128
125
107
130
131
111
114
113
110
112

POWER ROLLER UNIT AND OUTPUT DISC UNIT FOR TOROIDAL TYPE CONTINUOUSLY VARIABLE TRANSMISSION

CROSS REFERENCE TO RELATED APPLICATIONS

This application is a division of application Ser. No. 09/277,959 filed Mar. 29, 1999, now U.S. Pat. No. 6,238,318.

BACKGROUND OF THE INVENTION

1. Field of the Invention

The present invention relates to a power roller unit and an output disc unit for a toroidal type continuously variable transmission and more particularly, it relates to a power roller unit and an output disc unit which can make an assembling operation easy as for a toroidal type continuously variable transmission used, for example, as a transmission for a motor vehicle or a transmissions for various industrial machines, and can improve performance thereof by improving accuracy.

2. Related Background Art

As a transmission for a motor vehicle, use of a toroidal type continuously variable transmission as shown in FIGS. 21 and 22 has been investigated. For example, as disclosed in Japanese Utility Model Application Laid-open No. 62-71465 (1987), in the toroidal type continuously variable transmission, an input disc 2 is supported in coaxial with an input shaft 1 and an output disc 4 is secured to an end of an output shaft 3 disposed coaxially with the input shaft 1. Within a casing containing the toroidal type continuously variable transmission, there are provided trunnions 6 rockable around pivot shafts 5 disposed in twisted relations to the input shaft 1 and the output shaft 3.

That is to say, the pivot shafts 5 are provided on outer surfaces of these trunnions 6 at both ends thereof in a coaxial relation. Intermediate portions of the trunnions 6 support proximal ends of displacement shafts 7 so that, when the trunnions 6 are rocked around the pivot shafts 5, inclined angles of the displacement shafts 7 can be adjusted. Power rollers 8 are rotatably supported around the displacement shafts 7 supported by the trunnions 6. The power rollers 8 are interposed between opposed inner surfaces 2*a,* 4*a* of an input disc 2 and of an output disc 4. Each of the inner surfaces 2*a,* 4*a* has a concave surface obtained by rotating an arc around each pivot shaft 5. Peripheral surfaces 8*a* (formed as spherical convex surfaces) of the power rollers 8 abut against the inner surfaces 2*a,* 4*a*.

An urging device 9 of loading cam type is disposed between the input shaft 1 and the input disc 2 so that the input disc 2 can be urged elastically toward the output disc 4 by the urging device 9. The urging device 9 comprises a cam plate 10 rotated together with the input shaft 1, a plurality (for example, four) of rollers 12 rotatably retained (held) by a retainer (holder) 11. A drive cam surface (circumferential uneven (convex and concave) surface) 13 is formed one side (left side surface in FIGS. 21 and 22) of the cam plate 10, and a driven cam surface 14 having similar configuration is formed on an outer surface (right side surface in FIGS. 21 and 22) of the input disc 2. The plurality of rollers 12 are supported for rotation around shafts directed radially with respect to a center of the input shaft 1.

In use of the toroidal type continuously variable transmission having the above-mentioned construction, when the cam plate 10 is rotated as the input shaft 1 is rotated, the drive cam surface 13 urges the plurality of rollers 12 against the driven cam surface 14 formed on the outer surface of the input disc 2. As a result, the input disc 2 is urged against the power rollers 8, and, at the same time, the input disc 2 is rotated by the urging force between the drive and driven cam surfaces 13, 14 and the plurality of rollers 12. The, rotation of the input disc 2 is transmitted to the output disc 4 through the power rollers 8, thereby rotating the output shaft 3 secured to the output disc 4.

When a rotational speed ratio (transmission ratio) between the input shaft 1 and the output shaft 3 is changed, and particularly when speed reduction is effected between the input shaft 1 and the output shaft 3, the trunnions 6 are rotated in predetermined directions around the pivot shafts 5. And, the displacement shafts 7 are inclined so that the peripheral surfaces 8*a* of the power rollers 8 abut against a center side portion of the inner surface 2*a* of the input disc 2 and a peripheral side portion of the inner surface 4*a* of the output disc 4, respectively, as shown in FIG. 21. On the other hand, when speed increase is effected, the trunnions 6 are rotated in reverse directions around the pivot shafts 5. And, the displacement shafts 7 are inclined so that the peripheral surfaces 8*a* of the power rollers 8 abut against a peripheral side portion of the inner surface 2*a* of the input disc 2 and a center side portion of the inner surface 4*a* of the output disc 4, respectively, as shown in FIG. 22. When the inclination angles of the displacement shafts 7 are selected to intermediate values between FIG. 21 and FIG. 22, an intermediate transmission ratio can be obtained between the input shaft 1 and the output shaft 3.

FIGS. 23 and 24 show an example of a more concrete toroidal type continuously variable transmission disclosed in Japanese Utility Model Laid-open No. 1-173552 (1989). An input disc 2 and an output disc 4 are rotatably supported around a circular tubular input shaft 115 via needle bearings 16, respectively. A cam plate 10 is spline-connected to a peripheral surface of an end (left end in FIG. 23) of the input shaft 15 and is prevented from shifting a way from the input disc 2 by a flange 17. The cam plate 10 and a plurality of rollers 12 constitute an urging device 9 of loading cam type for rotating the input disc 2 while urging the input disc toward the output disc 4 on the basis of rotation of the input shaft 15. An output gear 18 is coupled to the output shaft 4 via keys 19 so that the input disc 4 and the output gear 18 can be rotated in a synchronous manner.

Both ends of a pair of trunnions 6 are supported by a pair of support plates 20 for rocking movement and displacement movement in an axial direction (direction perpendicular to the plane of FIG. 23; left-and-right direction in FIG. 24). That is to say, radial needle bearings (first radial bearings) 22 are provided between outer peripheral surfaces of pivot shafts 5 secured to the both ends of the trunnions 6 and inner peripheral surfaces of circular holes 21 formed in both ends of the support plates 20. Outer peripheral surfaces of outer races 23 of the radial needle bearings 22 are spherical convex surfaces so that these races are inserted within the circular holes 21 for rocking movement and axial displacement movement.

Displacement shafts 7 are supported within circular holes 24 formed in intermediate portions of the trunnions 6 supported between the pair of support plates 20 for rocking movement and axial displacement movement in this way. The displacement shaft 7 have support shaft portions 25 and pivot shaft portions 26 which are parallel with each other and eccentric (offset) from each other. The support shaft portions 25 are rotatably supported within the circular holes 24 via radial needle bearings (second radial bearings) 27. Power rollers 8 are rotatably supported around the pivot shaft portions 26 via radial needle bearings (third radial bearings) 28.

Incidentally, the pair of displacement shafts 7 are diametrically opposed with each other with respect to the input shaft 15. Directions of offset of the pivot shaft portions 26 of the displacement shafts 7 with respect to the support shaft portions 25 are the same (left and right opposite directions in FIG. 24) with respect to the rotational direction of the input and output discs 2, 4. Further, the offset directions are substantially perpendicular to the direction of the input shaft 15. Accordingly, the power rollers 8 are supported for a slight displacement movement in the direction of the input shaft 15. As a result, even if the power rollers 8 tend to displace along the axial direction (left-and-right direction in FIG. 23; direction perpendicular to the plane of FIG. 24) of the input shaft 15 due to elastic deformation of the constructural parts based on great loads acting on the constructural parts in accordance with the rotational force transmitting conditions, the displacement can be absorbed without excessive forces on the constructural parts.

Between outer surfaces of the power rollers 8 and inner surfaces of the intermediate portions of the trunnions 6, in order from the outer surfaces of the power rollers 8, there are provided thrust ball bearings (first thrust bearings) 29 and thrust needle bearings (second thrust bearings) 30 which are serially disposed with respect to a thrust force acting direction (up-and-down direction in FIGS. 23 and 24). The thrust ball bearings 29 support the thrust loads acting on the power rollers 8 while permitting rotations of the power rollers 8. Each such thrust ball bearings 29 includes a plurality of balls 31, an annular retainer 32 for rollingly holding the balls 31, and an annular outer race 33. Inner race tracks of the thrust ball bearings 29 are formed in the outer surface of the power rollers 8 and outer race tracks are formed in inner surfaces of the outer races 33.

Each of the thrust needle bearings 30 includes a race 34, a retainer 35, and a plurality of needles 36. The race 34 and the retainer 35 are assembled for slight displacement movement in a rotational direction. Such thrust needle bearings 30 are interposed between inner surfaces of the trunnions 6 and outer surfaces of the outer races 33 in a condition that the races 34 abut against the inner surfaces of the trunnions. Such thrust needle bearings 30 support the thrust loads acting on the outer races 33 while permitting rocking movements of the outer races 33 around the support shaft portions 25.

Further, drive rods 37 are coupled to one ends (left ends in FIG. 24) of the trunnions 6, and drive pistons 38 are secured to outer peripheral surfaces of intermediate portions of the drive roads 37. The drive pistons 38 are mounted within corresponding drive cylinders 39 in an oil-tight manner.

In case of the toroidal type continuously variable transmission having the above-mentioned construction, the rotation of the input shaft 15 is transmitted to the input disc 2 through the urging device 9. The rotation of the input disc 2 is transmitted to the output disc 4 through the pair of power rollers 8, and the rotation of the output disc 4 is taken from the output gear 18. When a rotational speed ratio between the input shaft 15 and the output gear 18 is changed, the pair of pistons 38 are displaced in opposite directions. In response to the displacement of the pistons 38, the pair of trunnions 6 are displaced in opposite directions, with the result that, for example, the lower power roller in FIG. 24 is displaced to the right in FIG. 24 and the upper power roller in FIG. 24 is displaced to the left in FIG. 24. Consequently, directions of tangential forces acting on contact areas between the peripheral surfaces 8*a* of the power rollers 8 and the inner surfaces 2*a*, 4*a* of the input and output discs 2, 4 are changed. In response to the change in the force directions, the trunnions 6 are rocked in opposite directions around pivot shafts 5 supported by the support plates 20. As a result, as shown in FIGS. 21 and 22, the contact positions between the peripheral surfaces 8*a* of the power rollers 8 and the inner surfaces 2*a*, 4*a* are changed, thereby changing the rotational speed ratio between the input shaft 15 and the output gear 18.

When the rotational speed ratio between the input shaft 15 and the output gear 18 is adjusted to a desired value, shift amounts of the pistons 38 are regulated. The regulation of the shift amounts of the pistons 38 is effected by engagement between precess cams (not shown) secured to ends or intermediate portions of the drive rods 37 and spools or sleeves of spool valves (not shown). When the rotational force is transmitted between the input shaft 15 and the output gear 18 as mentioned above, in response to the deformation of the constructural parts, the power rollers 8 are displaced in the axial direction of the input shaft 15, wit the result that the displacement shafts 7 pivotally supporting the power rollers 8 are slightly rotated around the support shaft portions 25. As a result of such rotations, the outer surfaces of the outer races 33 of the thrust ball bearings 20 and the inner surfaces of the trunnions 6 are displaced relative to each other. Since the thrust needle bearings 30 are disposed between the outer surfaces and the inner surfaces, a force required for causing the relative rotation is small. Accordingly, as mentioned above, a force for changing the inclined angle of each displacement shaft 7 can be made smaller.

Further, as shown in FIGS. 25 and 26, there has also been proposed constructions in which two input discs 102A, 102B and two output discs 104 are disposed around an input shaft 15 in order to increase torque which can be transmitted and these two input and output discs 102A, 103B, 104 are arranged in parallel with respect to a force transmitting direction. In both constructions shown in FIGS. 25 and 26, an output gear 121*a* is supported on a periphery of an intermediate portion of an input shaft 115*a* for rotational movement with respect to the input shaft 115*a* and the output discs 104 are spline-connected to cylindrical both ends at a center of the output gear 121*a*. Needle bearings 116 are disposed between inner peripheral surfaces of the output discs 104 and an outer peripheral surface of the input shaft 115*a* so that the output discs 104 are supported for rotational movement around and with respect to the input shaft 115*a* and displacement movement in an axial direction of the input shaft 115*a*. Further, the input discs 102A, 102B are supported on both ends of the input shaft 115*a* for rotational movement together with the input shaft 115*a*. The input shaft 115*a* is rotated by a drive shaft 135 via an urging device 109 of loading cam type. Incidentally, a radial bearing 136 such as a sliding bearing or a needle bearing is disposed between an outer peripheral surface of a distal end (left end in FIGS. 25 and 26) of the drive shaft 135 and an inner peripheral surface of a proximal end (right end in FIGS. 25 and 26) of the input shaft 115*a*. Accordingly, the drive shaft 135 and the input shaft 115*a* are assembled so that they can be displaced in the rotational direction in a coaxial relation.

However, a rear surface (left surface in FIGS. 25 and 26) of one 102A (left one in FIGS. 25 and 26) of the input discs abuts against a loading nut 137 directly (in the construction shown in FIG. 26) or via a coned disc spring 151 (in the construction shown in FIG. 25), thereby substantially preventing axial (left-and-right direction in FIGS. 25 and 26) displacement of the input disc with respect to the input shaft 115*a*. On the other hand, the input disc 102B opposed to a cam plate 110 is supported on the input shaft 115*a* via a ball spline 138 for axial displacement movement. A coned disc spring 139 and a thrust needle bearing 140 are disposed in series between a rear surface (right surface in FIGS. 25 and 26) of the input disc 102B and a front surface (left surface in FIGS. 25 and 26) of the cam plate 110. The coned disc spring 139 serves to apply pre-pressure to contact areas between inner surfaces 102*a*, 104*a* of the discs 102A, 102B, 104 and peripheral surfaces 108*a* of the power rollers 108. When the urging device 109 is operated, the thrust needle bearing 140 serves to permit relative rotation between the input disc 102B and the cam plate 110.

In case of the construction shown in FIG. 25, the output gear 121*a* is rotatably supported by a partition wall 141 within a housing via a pair of ball bearings 142 of angular type in a condition that displacement of the output gear is prevented. On the other hand, in case of the construction shown in FIG. 26, the output shaft 121*a* can freely be displaced in the axial direction. Incidentally, as shown in FIGS. 25 and 26, the reason why the toroidal type continuously variable transmission of so-called double cavity type in which the two input discs 102A, 102B and output discs 104 are disposed in parallel with respect to the power transmitting direction supports one or both of the input discs 102A, 102B via the ball splines 138, 138*a* for axial displacement movement is that the input discs 102A, 102B can be displaced in the axial direction of the input shaft 115*a* in response to deformation of the constructural parts caused by the operation of the urging device 9 while rotating the discs 102A, 102B in a synchronous manner.

When the toroidal type continuously variable transmission having the above-mentioned construction is assembled, conventionally, various constructural parts were assembled successively within the housing 40 (FIG. 24) containing the toroidal type continuously variable transmission. Accordingly, positional deviation between the parts due to total dimensional errors of the constructural parts, i.e., the fact whether the constructural parts are operated correctly or not could not be ascertained before all of the constructural parts are completely assembled within the housing 40.

In order to ensure efficiency and endurance of the toroidal type continuously variable transmission, positional relations between the constructural parts must be maintained with high accuracy. Thus, if the positional deviation between the parts due to the total dimensional errors of the constructural parts becomes great, the toroidal type continuously variable transmission once assembled within the housing must be disassembled and re-assembled in order to reduce the positional deviation by combining various parts with other parts.

When the toroidal type continuously variable transmission is assembled in this way, the assembly operation of the toroidal type continuously variable transmission becomes complicated and cost of the transmission cannot be reduced.

SUMMARY OF THE INVENTION

A power roller unit and an output disc unit for a toroidal type continuously variable transmission according to the present invention is invented in consideration of the above-mentioned circumstances.

For example, the power roller unit for the toroidal type continuously variable transmission according to the present invention may comprise a trunnion having both end surfaces to which coaxial pivot shafts are secured, first radial bearings disposed around the pivot shafts, a circular hole formed in an intermediate portion of the trunnion and directed perpendicular to axial directions of the pivot shafts, a displacement shaft including a support shaft portion and a pivot shaft portion which are parallel and eccentric to each other, the support shaft portion being rotatably supported within the circular hole via a second radial bearing, a power roller rotatably supported around the pivot shaft portion via a third radial bearing, and first and second thrust bearings disposed between an outer surface of the power roller and an inner surface of the intermediate portion of the trunnion and arranged in series along a thrust load acting direction. The trunnion, first, second and third radial bearings, displacement shaft, power roller, and first and second thrust bearings, which are discrete parts, are pre-assembled to a positional relation to be attained after assembling of the toroidal type continuously variable transmission is completed, before these parts are assembled to that toroidal type continuously variable transmission.

In the toroidal type continuously variable transmission to which the power roller units according to the present invention having the above-mentioned construction are assembled, in accordance with the same operation as that of the above-mentioned conventional toroidal type continuously variable transmission, a rotational force is transmitted between an input disc and an output disc, and a rotational speed ratio between these discs is changed by changing inclination angles of the trunnions.

Particularly, in case of the power roller unit for the toroidal type continuously variable transmission according to the present invention, the trunnion, first, second and third radial bearings, displacement shaft, power roller, and first and second thrust bearings, which are discrete parts, are pre-assembled to the positional relation to be attained after the assembling of the toroidal type continuously variable transmission is completed, before these parts are assembled to the toroidal type continuously variable transmission. Thus, positional deviation between constructural parts due to total dimensional errors of the constructural parts, i.e., the fact whether the constructural parts are operated correctly or not can be ascertained before these constructural parts are assembled within a housing. Accordingly, the positional relation between the constructural parts can be maintained with high accuracy without disassembling and re-assembling the entire toroidal type continuously variable transmission. Therefore, transmission efficiency and endurance of the toroidal type continuously variable transmission can be improved while reducing cost of product by increasing assembling efficiency. In case of a power roller unit for a toroidal type continuously variable transmission as specified in claim 1, although the number of constructural parts is smaller, the same advantage can be achieved.

In an output disc unit for toroidal type continuously variable transmission according to the present invention, an output disc having an arc-shaped concave inner surface and provided at its central portion with a circular through hole passing through the disc axially and rotatably supported around a periphery of an intermediate portion of a rotary shaft, a radial rolling bearing disposed within the through hole, and a stop ring locked within a lock groove formed in an inner peripheral surface of the through hole and adapted to prevent the radial rolling bearing from disengaging from the through hole are pre-assembled to the positional relation to be attained after the assembling of the toroidal type continuously variable transmission is completed, before these parts are assembled to the toroidal type continuously variable transmission.

In the toroidal type continuously variable transmission including the output disc unit according to the present invention having the above-mentioned construction, in accordance with the same operation as that of the above-mentioned conventional toroidal type continuously variable transmission, a rotational force is transmitted between an input disc and an output disc, and a rotational speed ratio between these discs is changed by changing inclination angles of the trunnions.

Particularly, in case of the output disc unit for the toroidal type continuously variable transmission according to the present invention, the output disc, radial bearing and stop ring, which are discrete parts, are pre-assembled to the positional relation to be attained after the assembling of the toroidal type continuously variable transmission is completed, before these parts are assembled to the toroidal type continuously variable transmission. Thus, the fact whether the constructural parts are operated correctly or not can be ascertained before these constructural parts are assembled within a housing. Accordingly, the positional relation between the constructural parts can be maintained with high accuracy without disassembling and re-assembling the entire toroidal type continuously variable transmission. Therefore, transmission efficiency and endurance of the toroidal type continuously variable transmission can be improved while reducing cost of product by increasing assembling efficiency.

DESCRIPTION OF THE PREFERRED EMBODIMENTS

Figure 1:
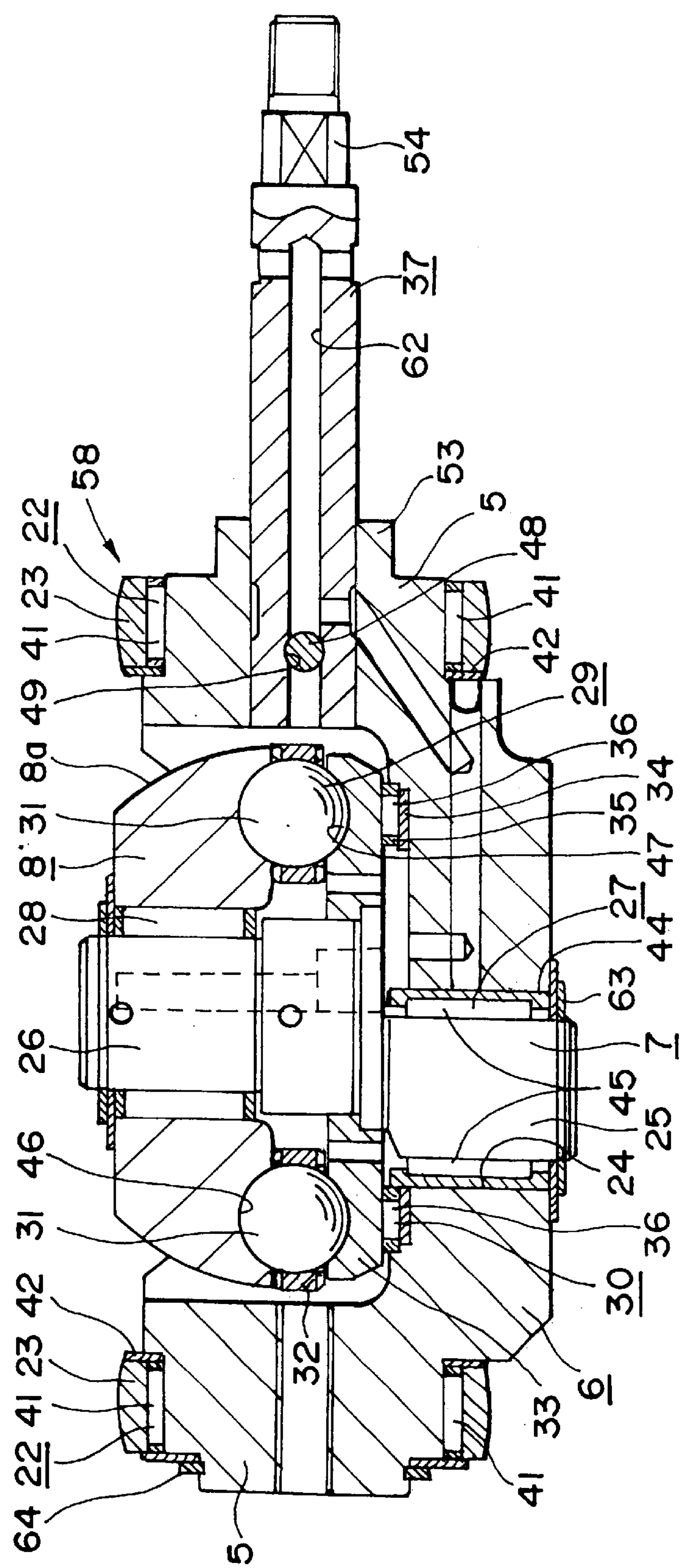
FIG. 1 is a sectional view showing a first embodiment of the present invention as a condition that trunnions, displacement shafts, power rollers and drive rods are assembled via a plurality of rolling bearings.
Figure 2:
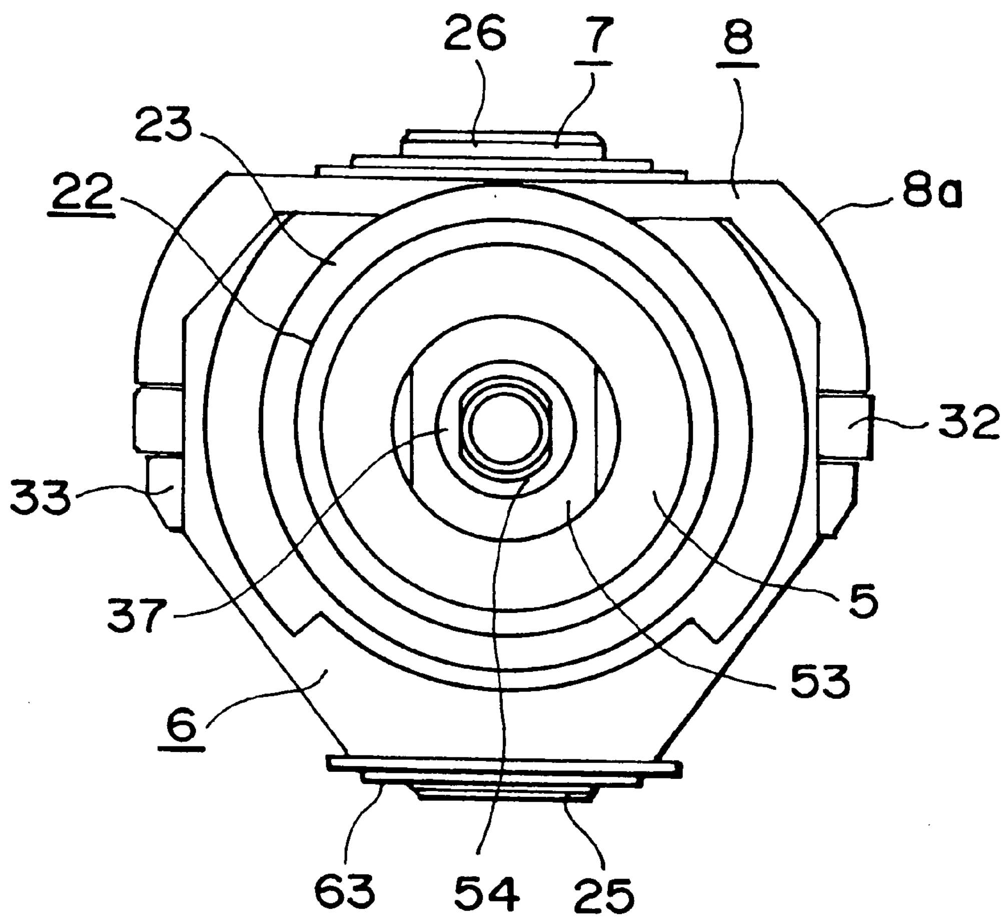
FIG. 2 is a view from the right in FIG. 1.

FIGS. 1 to 8 show a first embodiment of the present invention. Incidentally, the feature of the present invention is that an arrangement which bearings for supporting trunnions 6 rockably, displacement shafts 7, power rollers 8, and bearings for supporting the power rollers 8 rotatably and rockably are assembled to the trunnions 6 is handled as a unit. Since the other constructions and operation are the same as those of the above-mentioned conventional technique, explanation thereof will be omitted and only the characteristics of the present invention will be mainly explained.

Each of trunnions 6 formed integrally by forging and cutting (machining) metal having great rigidity such as alloy of iron group is provided at its both ends with a pair of coaxial pivot shafts 5. A pair of outer races 23 are disposed around the pivot shafts 5 in a coaxial relation to the pivot shafts 5. Each outer race 23 has a spherical convex outer peripheral surface and a cylindrical inner peripheral surface. A plurality of needles 41 are rotatably disposed between the inner peripheral surfaces of the races 23 and outer peripheral surfaces of the pivot shafts 5 to form radial needle bearings (first radial bearings) 22. Thrust washers 42 are disposed between inner end surfaces (central side end surfaces of the trunnions 6) of the outer races 23 constituting the radial needle bearings 22 and the trunnion 6 to avoid rubbing between the inner end surfaces of the outer races 23 and the trunnion 6, thereby preventing damage of the trunnion 6.

A circular hole 24 for supporting a displacement shaft 7 (described later) is formed in an intermediate portion of the trunnion 6. A center line of the circular hole 24 extends perpendicular to axial directions of the pivot shafts 5. A support shaft portion 25 constituting the displacement shaft 7 is rotatably supported within the circular hole 24 via a radial needle bearing (second radial bearing) 27. The radial needle bearing 27 comprises a cylindrical race 44 and a plurality of needles 45. An outer diameter of the race 44 is the same as or slightly greater than an inner diameter of the circular hole 24. Accordingly, the race 44 is fitted into the circular hole 24 with no interference (no fitting tolerance) or slight interference. In a condition that the support shaft portion 25 is rotatably supported within the circular hole 24 via the radial needle bearing 27, a pivot shaft portion 26 constituting the displacement shaft 7 protrudes from an inner side surface of the trunnion 6.

A power roller 8 is rotatably supported, via a radial needle bearing (third radial bearing) 28, around the pivot shaft portion 26 protruded from the inner side surface of the trunnion 6 in this way. Between an outer surface of the power roller 8 and an inner surface of the intermediate portion of the trunnion 6, there are provided a thrust ball bearing (first thrust bearing) 29 and a thrust needle bearing (second thrust bearing) 30 which are disposed in series with respect to a thrust load acting direction (up-and-down direction in FIGS. 1 and 2). The thrust ball bearing 29 includes a plurality of balls 31 disposed between an inner race track 46 formed in the outer surface of the power roller 8 and an outer race track 47 formed in an inner surface of an outer race 33. The thrust needle bearing 30 includes a race 34 provided on the inner surface of the trunnion 6, and a plurality of needles 36 rotatably held by a retainer 35. An angular bearing with an appropriate contact angle can be used instead of the thrust ball bearing.

A proximal end (left end in FIGS. 1, 3 and 7) of a drive rod 37 is fitted into and secured to one (right in FIG. 1) of the paired pivot shafts 5. In order to fit and secure the proximal end of the drive rod 37 into one of the paired pivot shafts 5, a coupling pin 48 formed from metallic material having high hardness is bridged between the pivot shaft 5 and the proximal end of the drive rod 37. To this end, through holes 49, 50 extending diametrical direction are formed in the proximal end of the drive rod 37 and the pivot shaft 5. An inner diameter of the through hole 49 formed in the proximal end of the drive rod 37 are uniform along its entire length. On the other hand, a smaller diameter portion 51 is formed at one end (right end in FIG. 4) of the through hole 50 formed in the pivot shaft 5. When the pivot shaft 5 and the drive rod 37 are interconnected, first of all, the proximal end of the drive rod 37 is press-fitted into the pivot shaft 5. In this case, the through holes 49, 50 are not yet formed. After the proximal end of the drive rod 37 is pushed into the pivot shaft 5 by a predetermined amount, the thorough holes 49, 50 are formed by a drilling machine and the like. Accordingly, a troublesome operation in which the through holes 49, 50 are aligned with each other after the drive rod 37 is pushed into the pivot shaft 5 is not required. Then, the coupling pin 48 is press-fitted in the through holes 49, 50 aligned in this way, from a side opposite to the smaller diameter portion 51. After a inserted tip end of the coupling pin 48 abuts against an end of the smaller diameter portion 51, a caulking portion 52 is formed on the other end of the through hole 50, thereby preventing the coupling pin 48 from disengaging from the through holes 49, 50.

In a condition that the drive rod 37 is connected to the pivot shaft 5 provided at the end of the trunnion 6 in this way, a positional relation between the trunnion 6 and the drive rod 37 is determined reasonably. Even after long term use, the coupling pin 48 is not disengaged from the through holes 49, 50 thereby to prevent deviation of the positional relation between the trunnion 6 and the drive rod 37 without fail. Accordingly, a positional relation between a precess cam secured to the drive rod 3 7 and the trunnion 6 is surely maintained to positively control postures of the trunnion 6 and the power roller 8 supported on the inner surface of the trunnion 6. Incidentally, an oil supply passage 62 for supplying lubricating oil to a rotational support part of the power roller 8 is formed in the trunnion 6 and the drive rod 37. The coupling pin 48 also acts as a blank plug (blind peg) for closing a part of the through hole constituting the oil supply passage 62 to supply the lubricating oil to a desired area.

A fitting protruded portion 53 having an elliptical outer peripheral surface shape is formed on a tip end surface of the pivot shaft 5 to which the drive rod 37 is connected, and a fitting support portion 54 having an elliptical outer peripheral surface shape is formed on a tip end (right end in FIG. 1) of the drive rod 37. A pulley-shaped lock member for locking a cable (not shown) for synchronizing rocking movements of the front and rear trunnions 6 constituting the toroidal type continuously variable transmission of double cavity type is fitted on and secured to the fitting protruded portion 53. On the other hand, a precess cam for detecting displacement of the drive rod 37 and the trunnion 6 is fitted on and supported by the fitting support portion 54. In a condition that the lock member or the precess cam is fitted on the fitting protruded portion 53 or the fitting support portion 54 having the elliptical outer peripheral surface shape, the lock member or the precess cam is not deviated from the drive rod 37 and the trunnion 6 in a rotational direction. Accordingly, the rocking movements between the front and rear trunnions 6 can surely be effected by the cable, and the postures of the trunnion 6 and of the power roller 8 supported on the inner surface of the trunnion 6 can surely be controlled by the precess cam.

Figure 3:
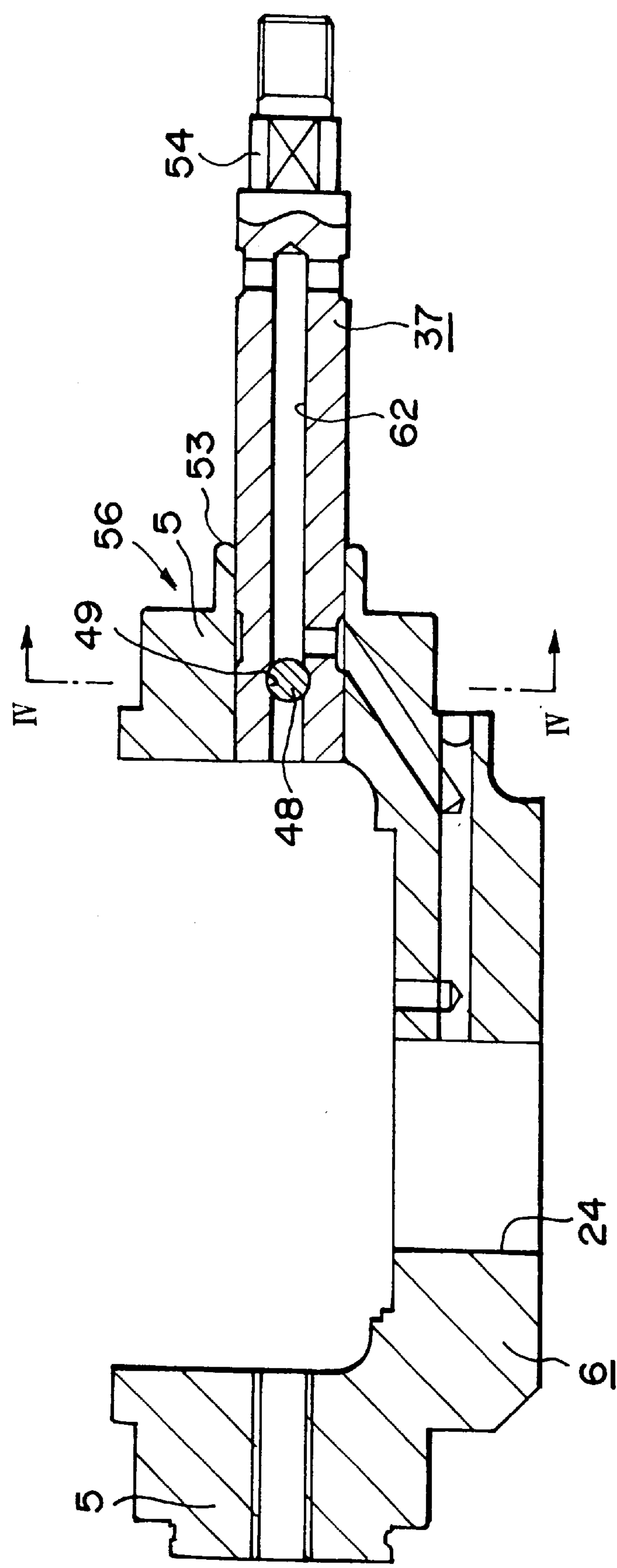
FIG. 3 is a sectional view showing a condition that the trunnions and the drive rods are assembled.
Figure 4:
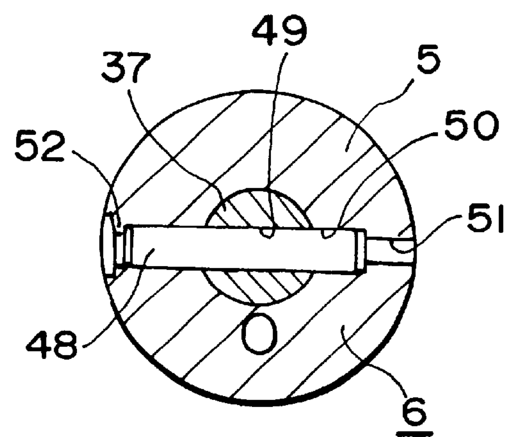
FIG. 4 is a sectional view taken along the line IV—IV in FIG. 3.
Figure 5:
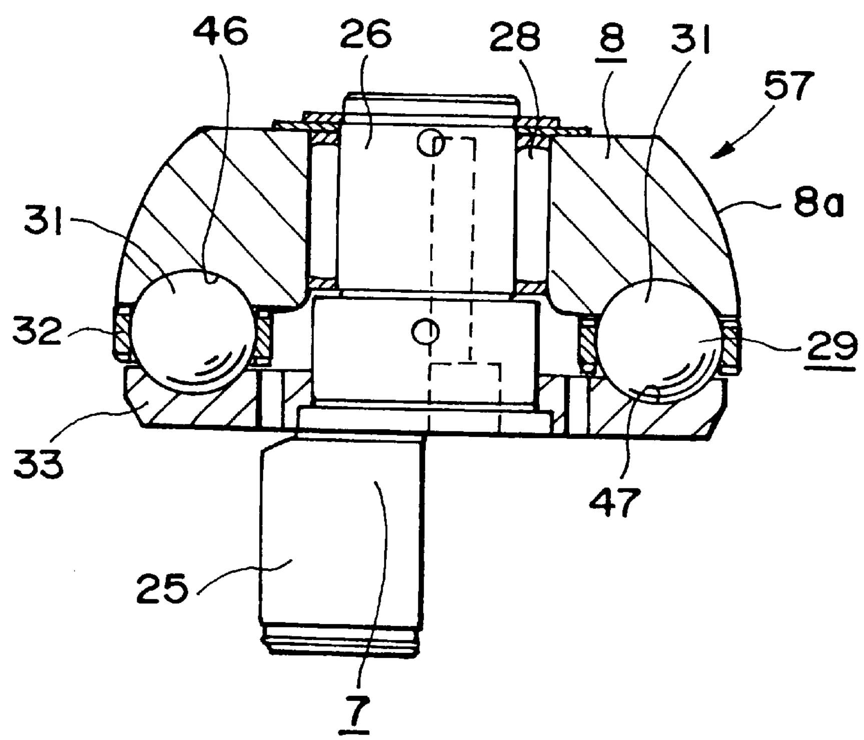
FIG. 5 is a sectional view showing a condition that the power rollers and the displacement shafts are assembled via the plurality of rolling bearings.
Figure 23:
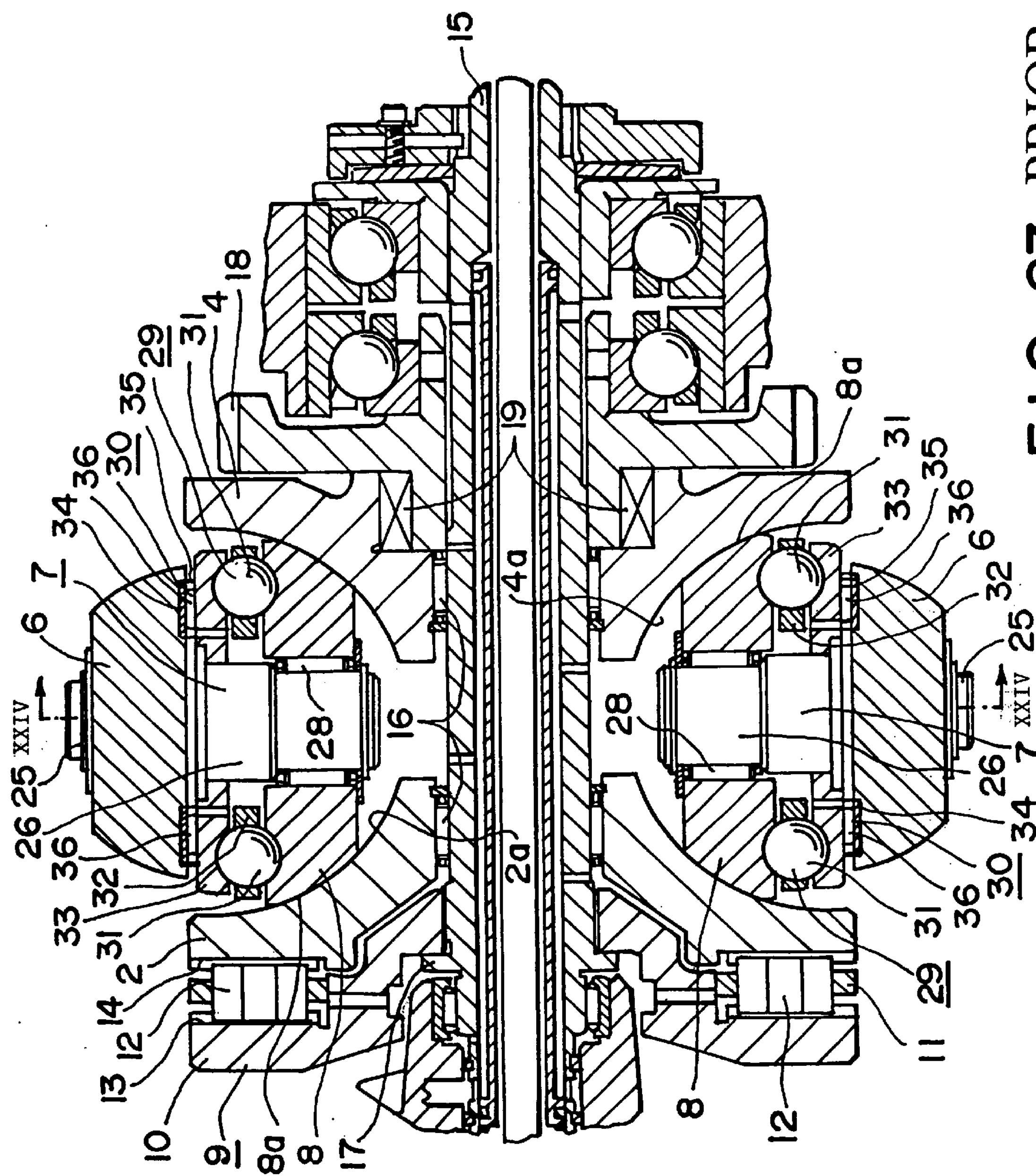
FIG. 23 is a sectional view showing a first example of a conventional concrete construction.
Figure 24:
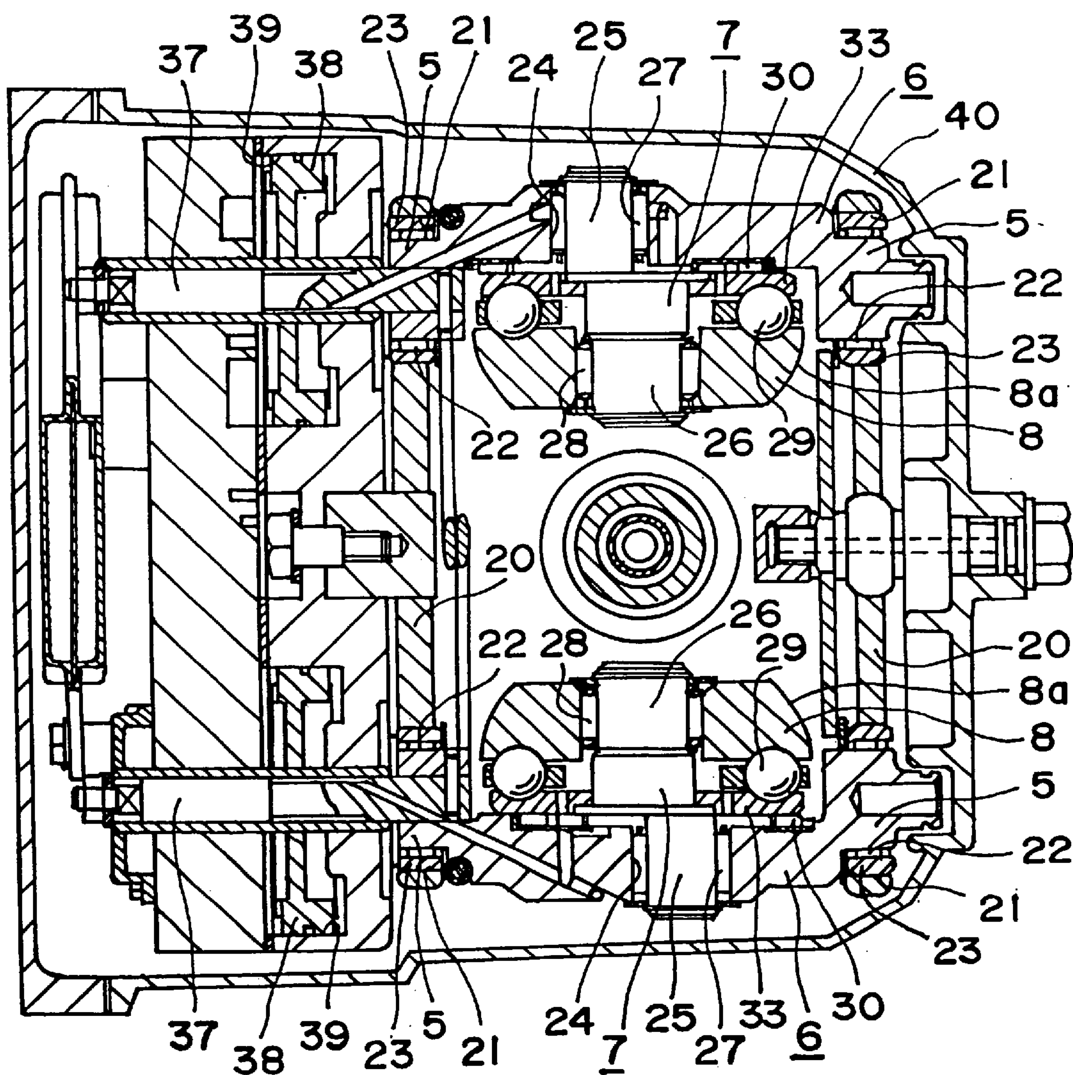
FIG. 24 is a sectional view taken along the line XXIV—XXIV in FIG. 23.
Figure 25:
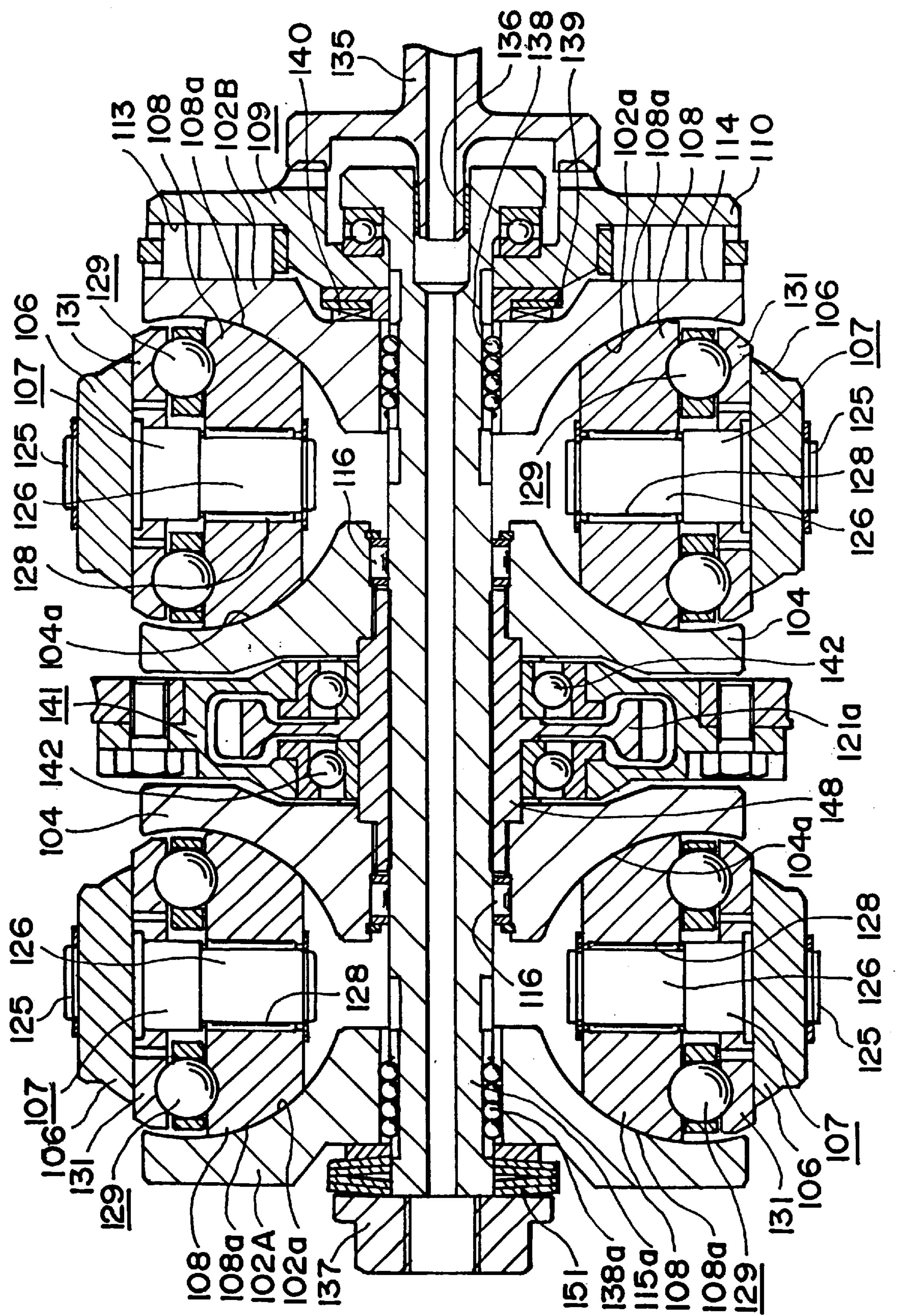
FIG. 25 is a partial sectional view showing a second example of a conventional concrete construction.

In case of the power roller unit for the toroidal type continuously variable transmission according to the present invention, the trunnion 6, radial needle bearings 22, 27, 28, displacement shaft 7, power roller 8, thrust ball bearing 29, thrust needle bearing 30 and drive rod 37, which are discrete parts, are pre-assembled to the positional relation to be attained after the assembling of the toroidal type continuously variable transmission as shown in FIGS. 23 and 24 is completed, before these parts are assembled to the toroidal type continuously variable transmission. In order to assemble these parts 6, 22, 27, 28, 7, 8, 29, 30, 37 in this way, a first unit 56 in which the trunnion 6 is connected and secured to the connecting rod 37 as shown in FIG. 3 and a second unit 57 in which the displacement shaft 7 and the power roller 8 and the thrust ball bearing 29 are combined as shown in FIG. 5 are assembled previously. And, by assembling these first and second units 56, 57 via the radial needle bearing 27 and the thrust needle bearing 30, a power roller unit 58 as shown in FIGS. 1, 2, 6, 7 and 8 is obtained.

Figure 6:
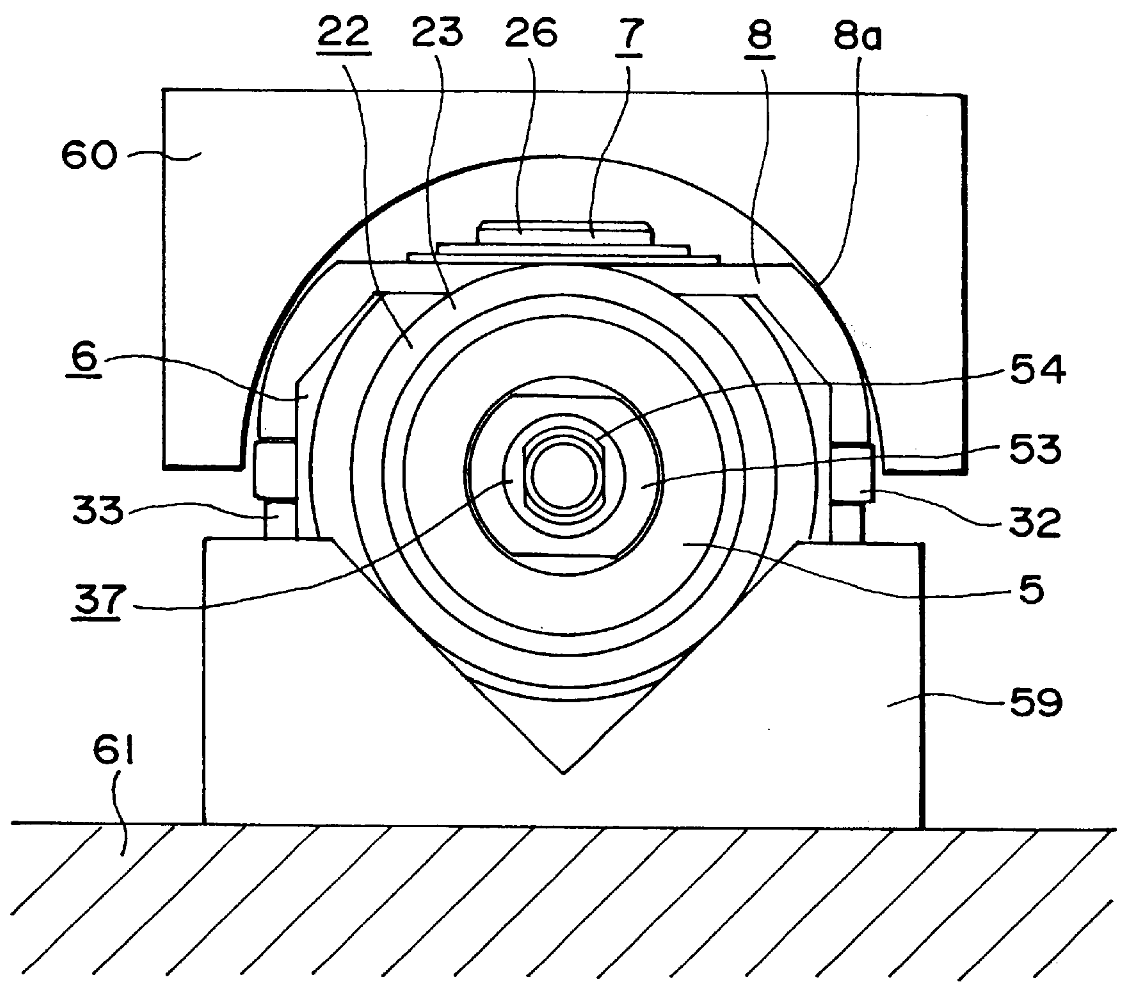
FIG. 6 is a view showing a condition that an assembled height of a power roller unit is measured, looked at from a direction same as FIG. 2.
Figure 21:
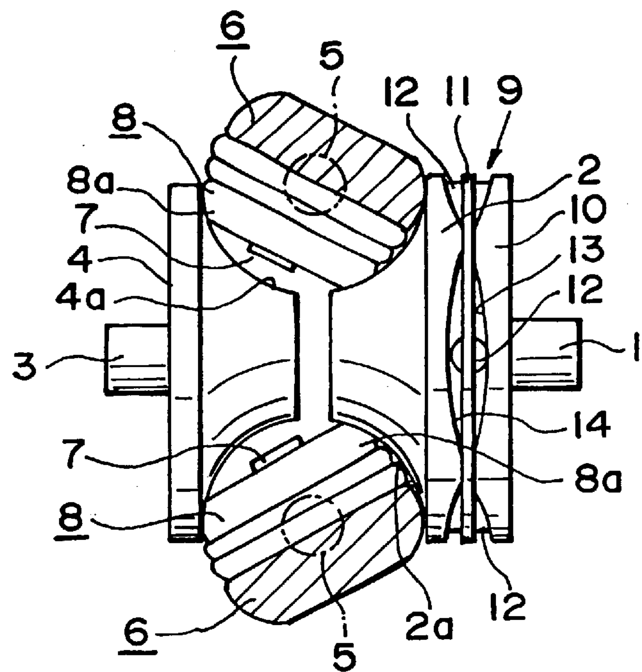
FIG. 21 is a side view of a conventional toroidal type continuously variable transmission in a maximum speed reduction condition.
Figure 22:
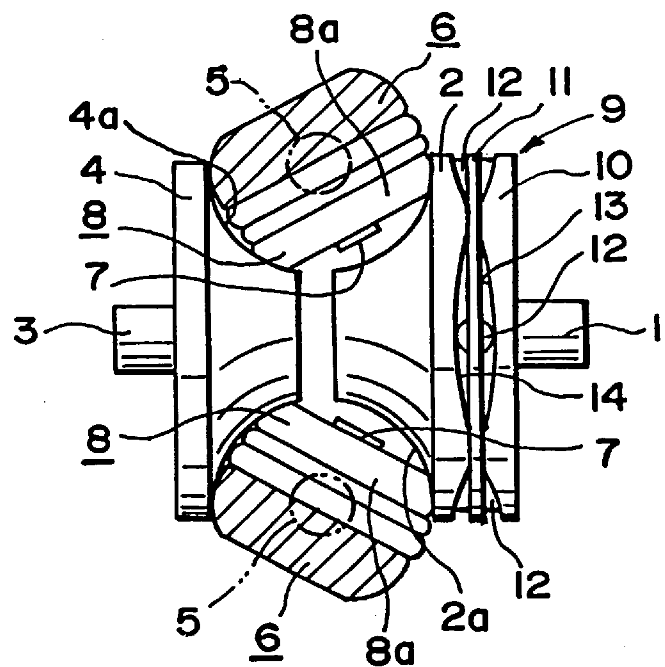
FIG. 22 is a side view showing a maximum speed increase condition.

After the power roller unit 58 is obtained by assembling the parts 6, 22, 27, 28, 7, 8, 29, 30, 37 as mentioned above, as shown in FIGS. 6 to 8, the dimension and operating condition of each part are ascertained. FIG. 6 shows a condition that a relation between an outer peripheral surface position of the outer race 23 constituting the radial needle bearing 22 for supporting the trunnion 6 with respect to the support plates 20 (FIG. 24) and a position of the peripheral surface 8*a* of the power roller 8 is measured. In order to perform such measurement, the outer races 23 of the radial needle bearings 22 provided around the periphery of the pivot shafts 5 on the both ends of the trunnion 6 are rested on V-shaped blocks 59 installed on a fixed table 61, respectively. A measuring tool 60 having a configuration corresponding to the inner surfaces 2*a*, 4*a* (FIGS. 21 to 23) of the input and output discs 2, 4 is put on the power roller 8, and a distance (height) between an upper surface of the fixed table 61 and an upper surface of the measuring tool 60 is measured. By combining a plurality of power roller units 58 having small height difference, the toroidal type continuously variable transmission is obtained.

That is to say, a plural sets of power roller units 58 are incorporated into one toroidal type continuously variable transmission. For example, in case of a so-called toroidal type continuously variable transmission of single cavity type in which only one pair of input and output discs 2, 4, two or three sets of power roller units 58 are incorporated. On the other hand, in case of a so-called toroidal type continuously variable transmission of double cavity type in which two pairs of input and output discs 2, 4 are provided and the two pairs of input and output discs 2, 4 are arranged in parallel to each other with respect to a power transmitting direction, four to six sets of power roller units 58 are incorporated. Regarding the plural sets of power roller units 58 incorporated into one toroidal type continuously variable transmission in this way, if the above-mentioned heights are different from each other, contact areas between the peripheral surfaces 8*a* of the power rollers 8 and the inner surfaces 2*a,* 4*a* of the input and output discs 2, 4 will be slipped or the speed ratios of the power rollers 8 will not be synchronized correctly, thereby resulting in poor transmission.

To avoid this, regarding the plural sets of power roller units 58 incorporated into one toroidal type continuously variable transmission, a plural sets of power roller units 58 having the height difference of 0.1 mm or less are selected, and one toroidal type continuously variable transmission is assembled by using such power roller units 58. The reason why the predetermined value is set to 0.1 mm is based on tests effected by the Inventor. The tests were effected by using toroidal type continuously variable transmissions of double cavity type in which two pairs of input and output discs 2, 4 are provided and two power roller units 58 (four in total) are disposed between the respective inner surfaces 2*a,* 4*a* of the input and output discs 2, 4, and influence of the height difference of each power roller unit 58 and temperature of traction oil filled within the housing 40 (FIG. 24) upon the slipping between the peripheral surface 8*a* and the inner surfaces 2*a,* 4*a* and upon the transmission condition was measured. Incidentally, the power roller units having proportions as shown and including the power roller 8 having an outer diameter of 78 mm were used. The test results are shown in the following Table 1.

TABLE 1

| Assembling height of power roller unit (deviation against proper size: mm) | | | | | | |
|---|---|---|---|---|---|---|
| No. 1 | No. 2 | No. 3 | No. 4 | LDMV | Slip limit | TC |
| −0.03 | −0.01 | −0.02 | −0.01 | 0.02 | not slip at 130° C. | good |
| 0 | 0.02 | −0.01 | 0 | 0.03 | same as above | good |
| 0.05 | 0.05 | 0.06 | 0.08 | 0.03 | same as above | good |
| −0.02 | 0.03 | 0.03 | −0.02 | 0.05 | same as above | good |
| 0.05 | 0.04 | 0.01 | 0 | 0.05 | same as above | good |
| 0.06 | 0.07 | 0 | 0.05 | 0.07 | same as above | good |
| 0.05 | 0.06 | 0.07 | −0.01 | 0.08 | same as above | good |
| −0.02 | 0.06 | 0.01 | 0.05 | 0.08 | same as above | good |
| 0.01 | 0.05 | −0.04 | 0.05 | 0.09 | same as above | good |
| 0.05 | −0.01 | −0.03 | −0.04 | 0.09 | same as above | good |
| −0.03 | −0.03 | 0.01 | −0.08 | 0.09 | same as above | good |
| −0.07 | −0.01 | −0.02 | 0.04 | 0.11 | slip at 125° C. | good |
| −0.07 | 0.04 | 0 | 0.04 | 0.11 | slip at 118° C. | good |
| −0.1 | 0.03 | 0.02 | 0.03 | 0.13 | slip at 103° C. | bad |
| −0.12 | 0.03 | 0.04 | −0.05 | 0.16 | slip at 84° C. | bad |

"LDMV" = maximum value of relative difference;
"TC" = transmission condition.

As apparent from the above Table 1, regarding the plural sets of power roller units 58 incorporated into one toroidal type continuously variable transmission, so long as the difference of height up to the peripheral surface 8*a* of the power roller 8 based on the outer peripheral surfaces of the outer races 23 of the radial needle bearings 22 for supporting the pivot shafts 5 (i.e., difference of assembling height of the power roller unit 58) is suppressed to 0.1 mm or less, the slip can be prevented at the contact area between the peripheral surface 8*a* and the inner surfaces 2*a,* 4*a* of the input and output discs 2, 4 and the transmission condition can be maintained to the good condition. Incidentally, in order to obtain plural sets of power roller units 58 having the height difference smaller than 0.1 mm, although power roller units satisfying the requirement may be selected among a number of power roller units, a thickness of the race 34 constituting the thrust needle bearing 30 may be changed. That is to say, as the race 34, a plurality kinds of races having thicknesses which slightly differ are prepared, and, after the measuring operation as shown in FIG. 6 was effected, by incorporating a proper race 34, the height difference can be limited to the predetermined value. Also, by changing a thickness of the outer race 33, the height difference can be limited to the predetermined value. When the measuring operation is performed before the stop ring 63 is mounted on the end of the support shaft portion 25, the race 34 can easily be replaced. Further, as is in the present invention, when the height difference is measured at the stage of the power roller unit 58, the occurrence of the slip and poor transmission can be prevented without complicated and troublesome correspondence to the other constructural parts (since cause of the poor operation can easily and reliably be investigated and specified).

Figure 7:
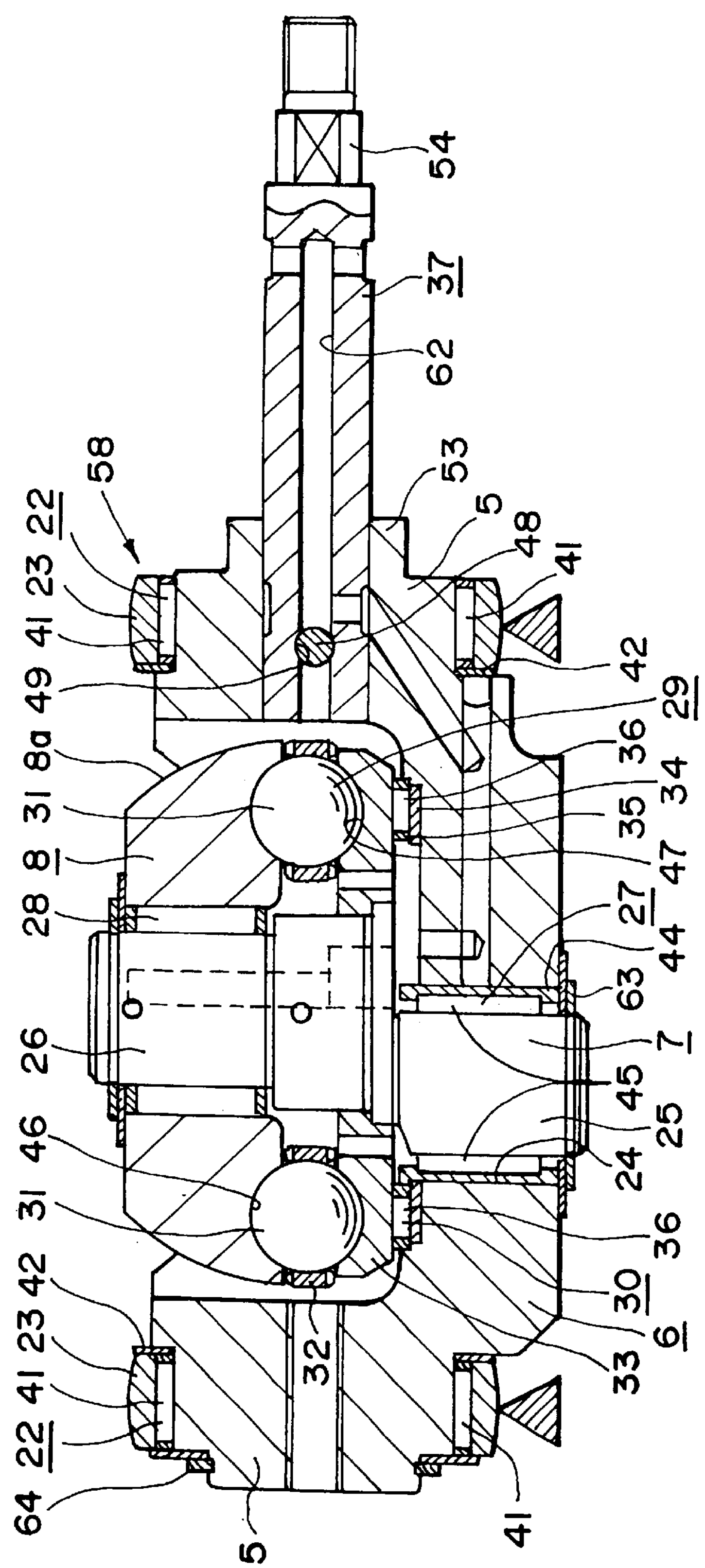
FIG. 7 is a sectional view showing a condition that a function of the power roller unit is recognized, looked at from a direction same as FIG. 1.
Figure 8:
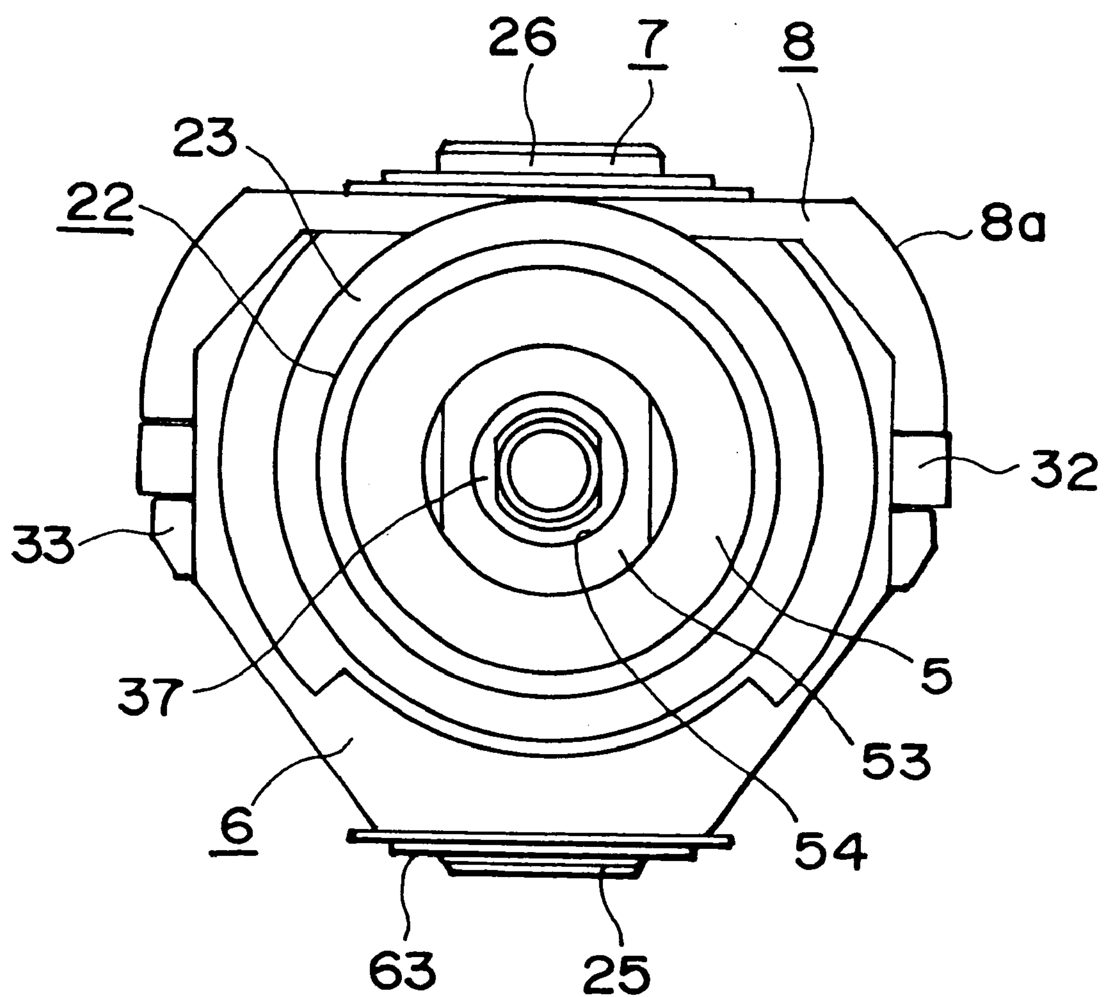
FIG. 8 is a view looked at from the right in FIG. 7.

After the power roller unit 58 is assembled, the difference of height up to the peripheral surface 8*a* of the power roller 8 based on the outer peripheral surfaces of the outer races 23 is measured and the function (such as run out and parallelism of the peripheral surface 8*a*) of the power roller unit 58 is ascertained. The function ascertaining operation is performed, for example, as shown in FIGS. 7 and 8. First of all, in order to measure the run out (whirling) and parallelism of the peripheral surface 8*a,* in a condition that the outer peripheral surfaces of the outer races 23 constituting the radial needle bearings 22 provided around the pivot shafts 5 on both ends of the trunnion 6 is rested on a reference plane (or the outer peripheral surfaces of the pivot shafts 5 with radial needle bearings 22 omitted is directly rested on the reference plane), the power roller 8 is rotated. And, displacement of a part (rolling surface portion) of the peripheral surface 8*a* of the power roller 8 which is rollingly contacted with the inner surfaces 2*a,* 4*a* of the input and output discs 2, 4 is measured by a precise measuring device such as a comparator, thereby measuring the run out and parallelism. Further, the run out of the tip end portion of the drive rod 37 is measured by rocking the trunnion 6 and the drive rod 37 around the radial needle bearings 22, and it is ascertained whether the run out is included within an allowable range or not. Further, it is ascertained whether accuracy and configuration of trace of the rocking movement of the power roller 8 rotatably supported around the pivot shaft portion 26 of the displacement shaft 7 are performed as design specification, by rocking the displacement shaft 7 around the support shaft portion 25. Further, it is ascertained whether the radial needle bearings 22 are rotated smoothly.

Regarding a power roller unit in which it is judged that the relation between the outer peripheral surface position of the outer race 23 constituting the radial needle bearing 22 and the position of the peripheral surface 8*a* of the power roller 8 is proper and it is judged that the functions of various parts are proper by the above-mentioned operation, the constructural parts 6, 22, 27, 28, 7, 8, 29, 30, 37 are temporarily fixed by using appropriate tools. On the other hand, if the positional relation or the functions are not proper, these parts are disassembled and are replaced by other parts and are re-assembled.

According to the present invention, the positional deviation between the constructural parts due to total dimensional errors of the constructural parts, i.e., the fact whether the constructural parts are operated correctly or not can be ascertained before these constructural parts are assembled within the housing 40. Accordingly, the positional relation between the constructural parts can be maintained with high accuracy to ensure the transmission efficiency and endurance of the toroidal type continuously variable transmission without the troublesome operations such as disassembling and re-assembling of the entire toroidal type continuously variable transmission. The power roller unit 58 in which the parts 6, 22, 27, 28, 7, 8, 29, 30, 37 are assembled is incorporated into the housing together with an input disc unit and an output disc unit in which a plurality parts are assembled, thereby providing the toroidal type continuously variable transmission. Similar to the power roller unit 58, in the input and output disc units, after a plurality of parts were assembled and before the assembly is incorporated into the housing 40, dimensions and operating conditions of the parts are ascertained. If the dimensions and operating conditions are proper, the parts are temporarily fixed by using appropriate tools. Accordingly, in a condition that the toroidal type continuously variable transmission is provided by assembling these units, the operating conditions of the parts can be made optimum. Incidentally, surfaces of the parts constituting these units are coated by rust-inhibiting oil (preservative oil). Preferably, as the rust-inhibiting oil, designated rust-inhibiting oil which does not deteriorate the traction oil even if the rust-inhibiting oil is mixed with the traction oil within the toroidal type continuously variable transmission.

Figure 9:
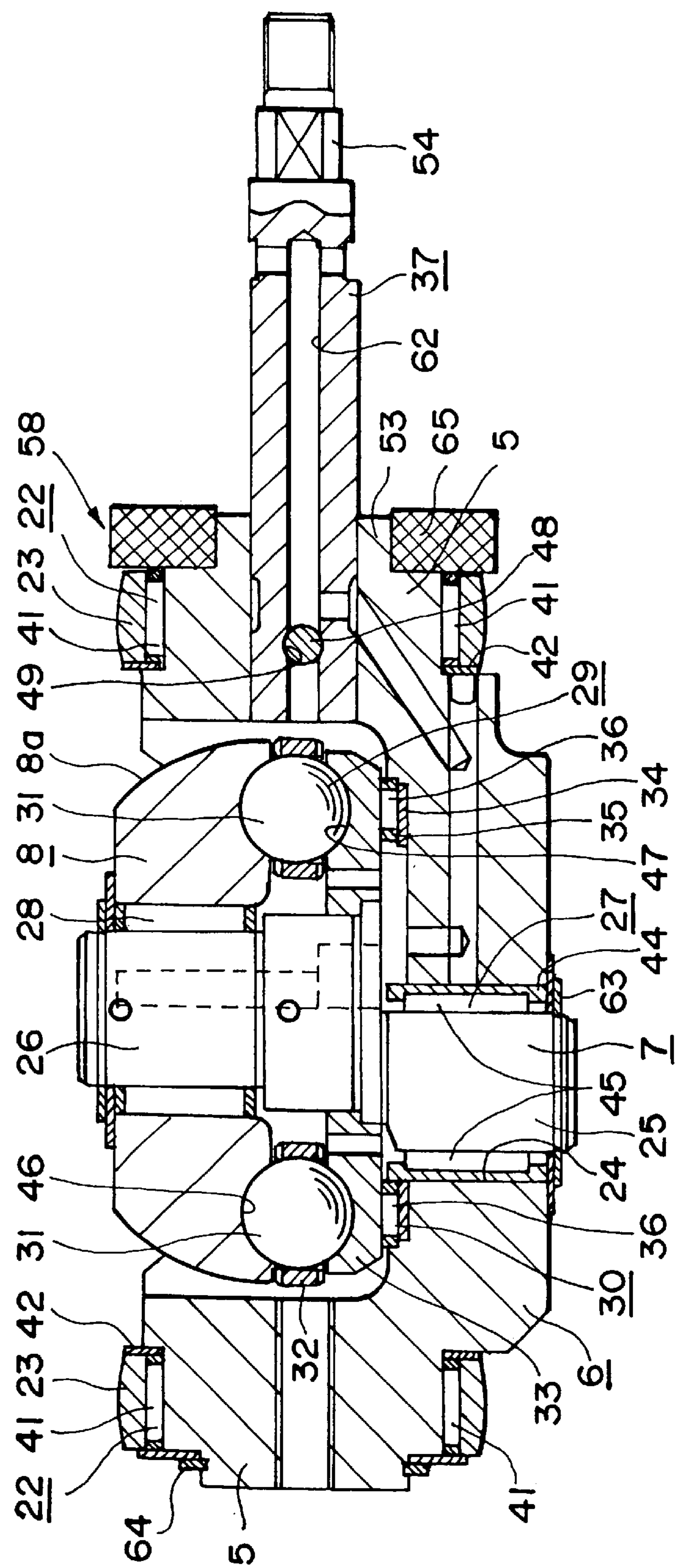
FIG. 9 is a sectional view similar to FIG. 1, showing a second embodiment of the present invention.
Figure 10:
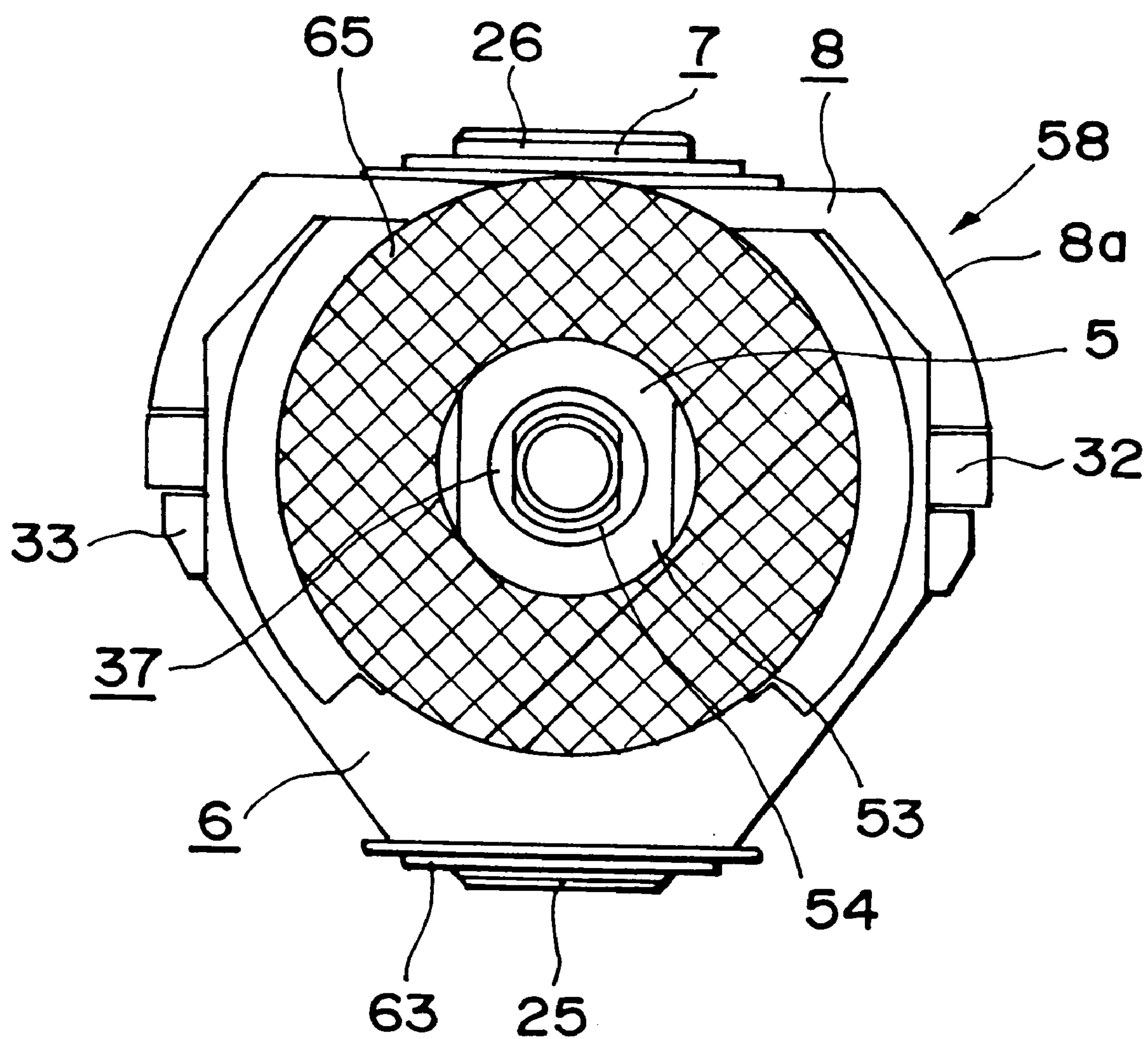
FIG. 10 is a view looked at from the right in FIG. 9.

FIGS. 9 and 10 show a second embodiment of the present invention. In this embodiment, a stop tool 65 is incorporated into the structure of the above-mentioned first embodiment, so that, when the power roller unit 58 is transported, the pre-assembled parts 6, 22, 27, 28, 7, 8, 29, 30, 37 are prevented from being disassembled. That is to say, among the parts 6, 22, 27, 28, 7, 8, 29, 30, 37, the parts other than the radial needle bearing 22 installed on the drive rod 37 are prevented from being disassembled by means of stop rings 63, 64 in the assembled condition of the power roller unit 58. The stop rings 63, 64, as they are, are incorporated into the housing 40 constituting the toroidal type continuously variable transmission. On the other hand, the radial needle bearing 22 installed on the drive rod 37 is apt to disengage from the pivot shaft 5 during the transportation. In the illustrated embodiment, an annular stop tool 65 made of elastic material such as rubber (for example, nitrile rubber) or synthetic resin such as polyamide is press-fitted onto the end portion of the pivot shaft 5 protruding from the radial needle bearing 22, thereby preventing the radial needle bearing 22 from disengaging from the pivot shaft 5. The other constructions and functions are the same as those in the first embodiment. Incidentally, although the stop tool 65 may be of disposable type, by using a re-usable stop tool, the cost of the toroidal type continuously variable transmission can be reduced and the resources can be saved.

Figure 11:
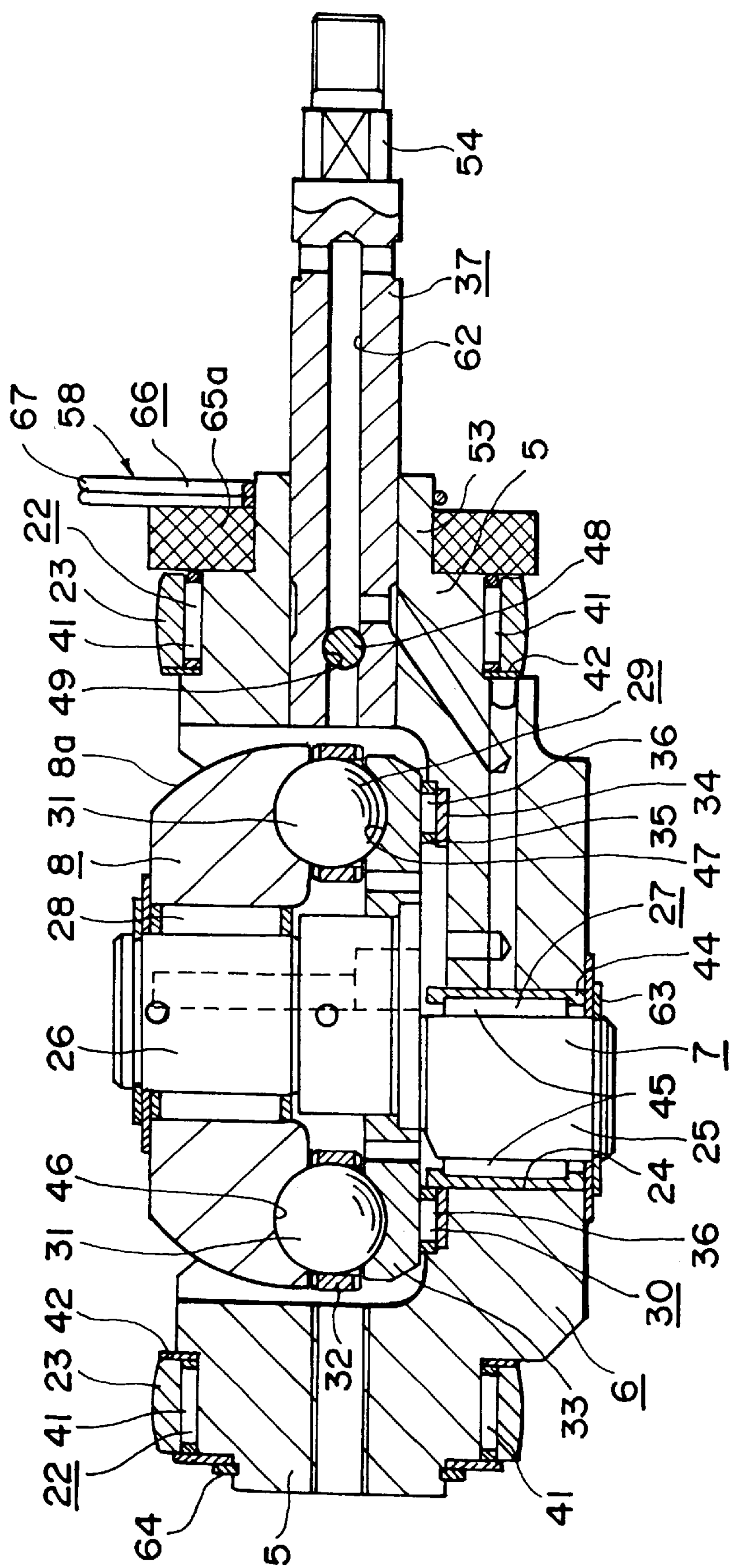
FIG. 11 is a sectional view similar to FIG. 1, showing a third embodiment of the present invention.
Figure 12:
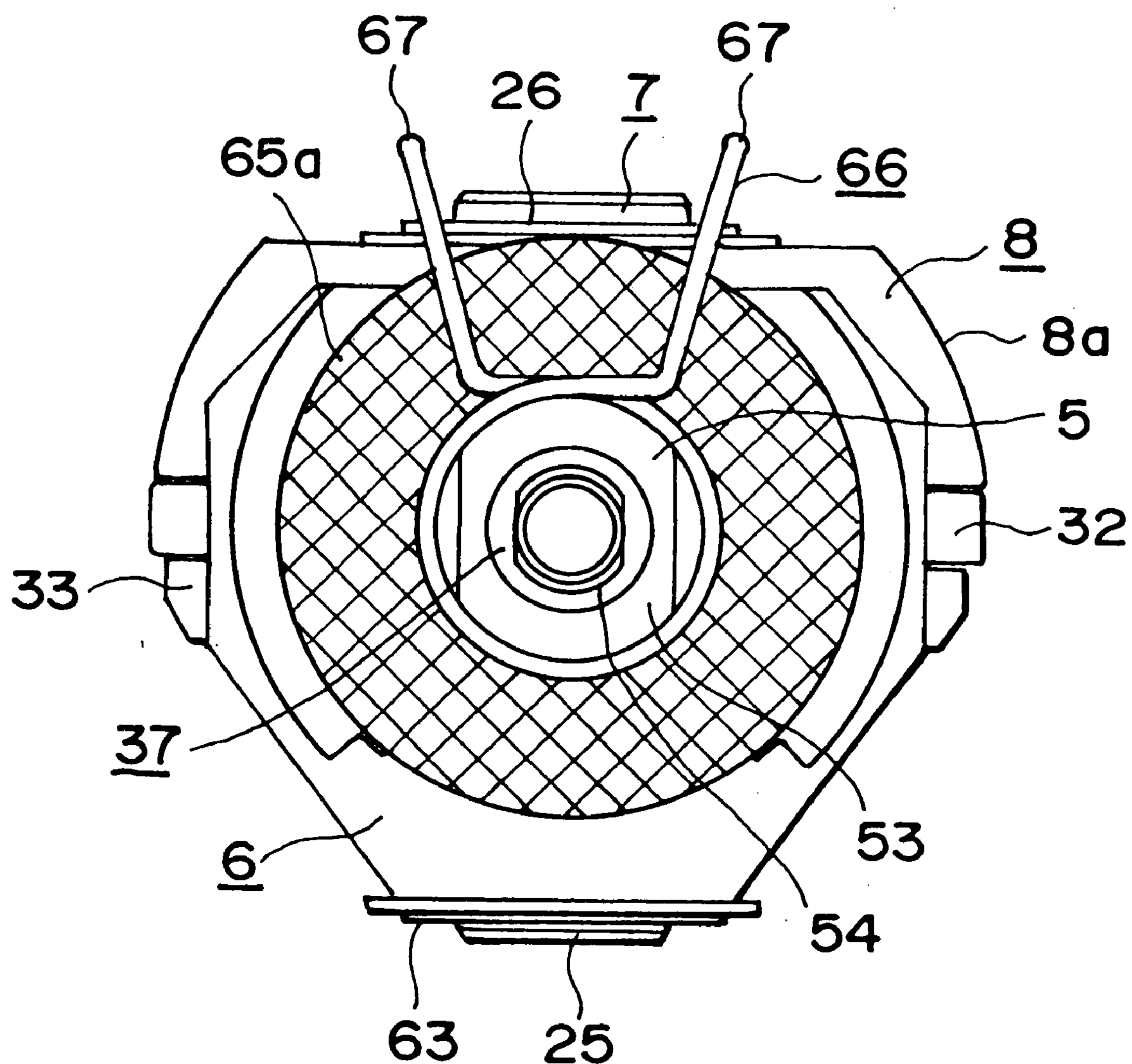
FIG. 12 is a view looked at from the right in FIG. 11.

FIGS. 11 and 12 show a third embodiment of the present invention. In the second embodiment, while an example that the stop tool 65 is prevented from disengaging from the tip end of the pivot shaft 5 by elasticity of the stop tool 65 itself was explained, in the third embodiment, a stop tool 65*a* fitted onto the tip end of the pivot shaft 5 is prevented from disengaging from the tip end of the pivot shaft 5 by elasticity of a stop spring 66. An inner diameter of the stop spring 66 formed from a coil spring is increased by manipulating grips 67 provided on both ends of the spring so that the spring can be mounted and dismounted with respect to the tip end of the pivot shaft 5. The other constructions and functions are the same as those in the second embodiment.

Figure 13:
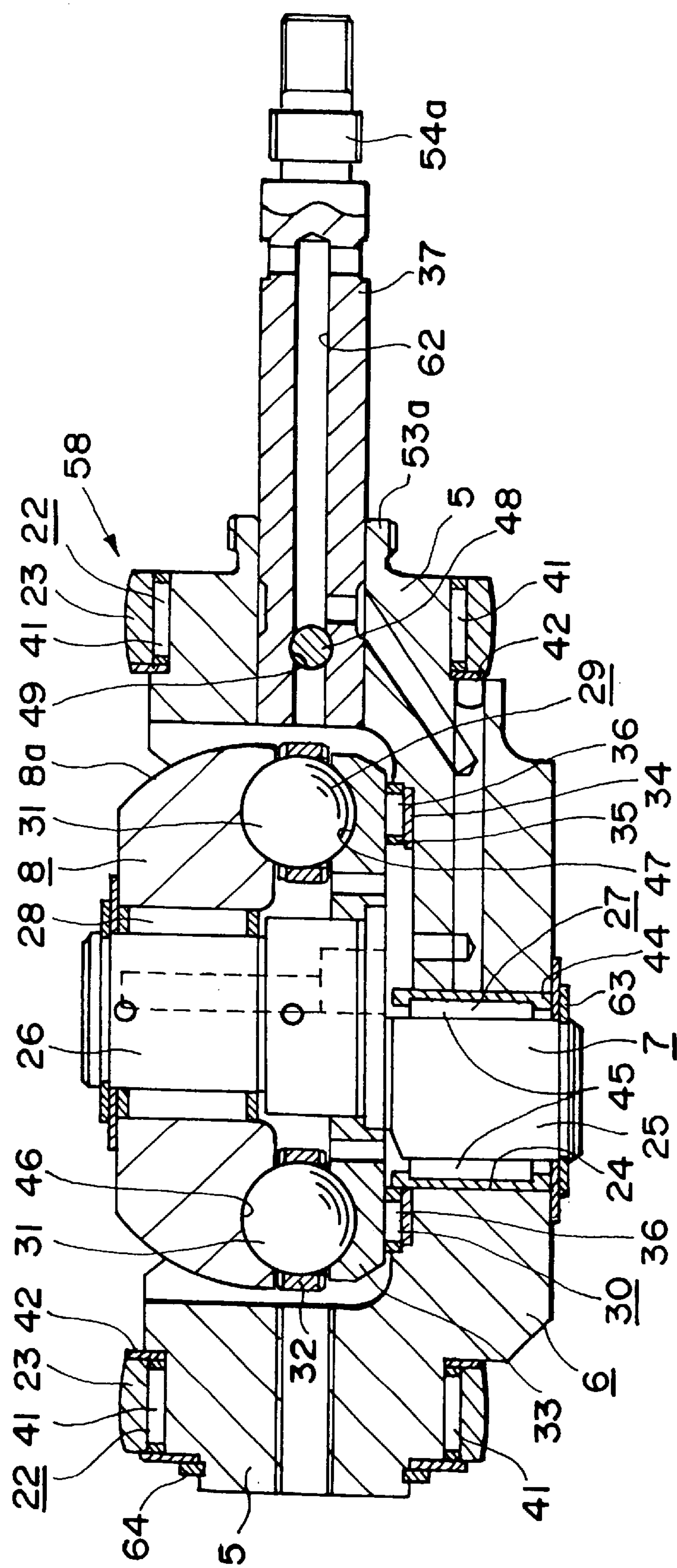
FIG. 13 is a sectional view similar to FIG. 1, showing a fourth embodiment of the present invention.
Figure 14:
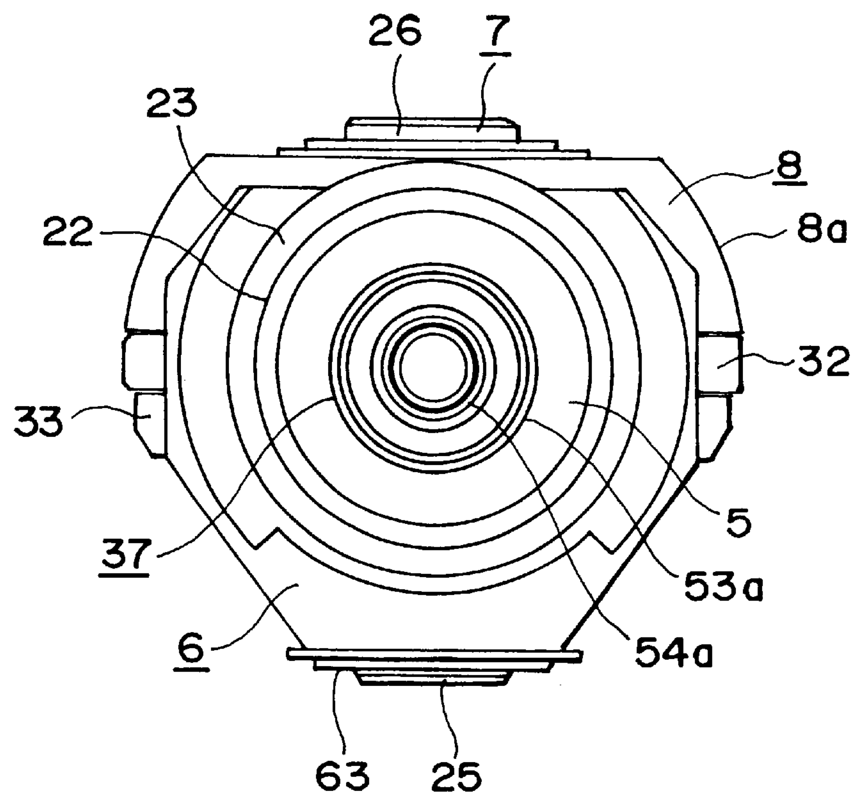
FIG. 14 is a view looked at from the right in FIG. 13.
Figure 15:
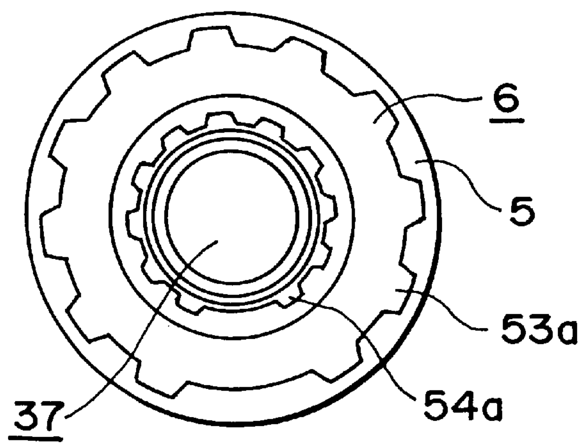
FIG. 15 is an enlarged view showing a central portion of FIG. 14.

FIGS. 13 to 15 show a fourth embodiment of the present invention. In this embodiment, a gear-shaped unevenness is formed on an outer peripheral surface of a fitting projection 53*a* which is formed at the end surface of the pivot shaft 5 formed on the end of the trunnion 6 and onto which a pulley-shaped lock member for locking a cable is to be fitted and secured and a gear-shaped unevenness is also formed on an outer peripheral surface of a fitting support portion 54*a* on which a precess cam (not shown) is fitted and supported. However, a non-toothed portion (a recessed portion having a width greater than those of the other recessed portions) is formed on each of the uneven outer peripheral surfaces of the fitting projection 53*a* and the fitting support portion 54*a*. Further, an internal gear-shaped unevenness including one protruded portion having a width greater than those of the other protruded portions is formed in each of inner peripheral surfaces of the lock member and the precess cam. Accordingly, in a condition that the lock member is fitted on and secured to the fitting projection 53*a* and the precess cam is fitted on and secured to the fitting support portion 54*a*, circumferential phases of the lock member and the precess cam with respect to the trunnion 6 and the drive rod 37 are determined reasonably. Thus, the erroneous positioning of the lock member and the precess cam with respect to the trunnion 6 and the drive rod 37 can be avoided and movement of the lock member or the precess cam in a rotational direction after the mounting can be prevented. The other constructions and functions are the same as those in the first embodiment.

Incidentally, the present invention can be similarly applied to both a toroidal type continuously variable transmission of single cavity type and a toroidal type continuously variable transmission of double cavity type.

According to the power roller unit for the toroidal type continuously variable transmission of the present invention, since the unit has the above-mentioned construction, assembling efficiency of the toroidal type continuously variable transmission is improved, thereby reducing the cost of the toroidal type continuously variable transmission.

Figure 16:
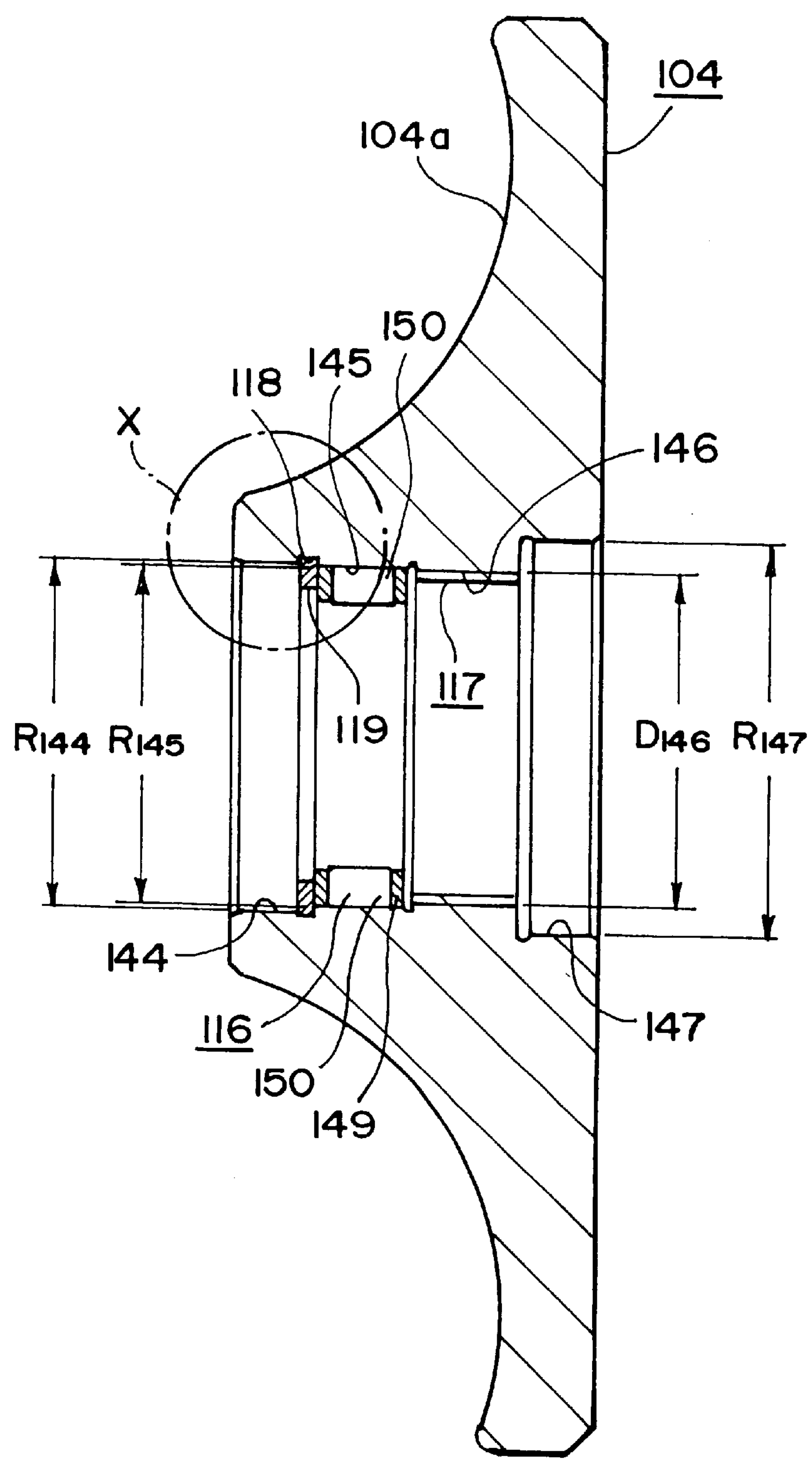
FIG. 16 is a sectional view showing a fifth embodiment of the present invention as a condition that an output disc, a needle bearing and a stop ring are assembled.
Figure 17:
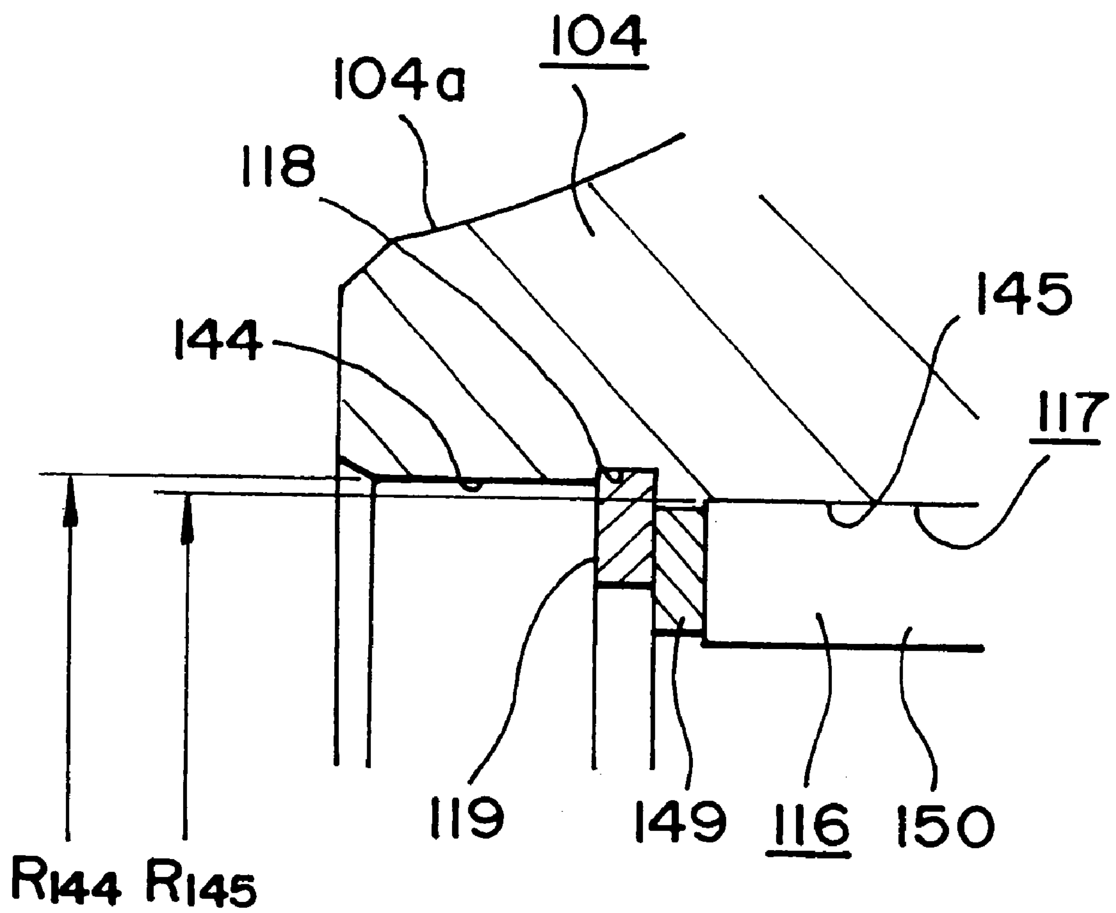
FIG. 17 is an enlarged view of a part X in FIG. 16.

Next, a fifth embodiment of the present invention shown in FIGS. 16 to 18 will be explained. Incidentally, a characteristic of the present invention is that a needle bearing 116 and a stop ring 119 are incorporated within an output disc 104 constituting the toroidal type continuously variable transmission to form a unit. Since the other constructions and functions are the same as those in the above-mentioned conventional transmission, explanation thereof will be omitted and the characteristic of the present invention will be mainly described.

The output disc 104 is integrally formed by forging hard metal such as cementation steel (blister steel) and has an inner concave surface 104*a* having arc-shaped section, and a through hole 117 passing through the disc in an axial direction (left-and-right direction in FIGS. 16 to 18) is formed in a central portion of the disc. As shown in FIG. 18, such an output disc 104 is supported around intermediate portion of an input shaft (rotary shaft) 115*a* for rotational movement with respect to the input shaft 115*a*. To this end, a needle bearing (radial rolling bearing) 116 is disposed on an inner peripheral surface of the through hole 117. In the inner peripheral surface of the through hole 117 an inner surface side large diameter portion 144, a cylindrical surface portion 145, a male spline portion 146 and an outer surface side large diameter portion 147 are disposed from an inner surface side to an outer surface side (from left to right in FIG. 16) and are arranged in series with respect to the axial direction.

The cylindrical surface portion 145 is provided at an area on the axial intermediate portion near the inner surface (near left in FIG. 16) to serve as an outer race track of the needle bearing 116. The male spline portion 146 is adapted to engage with a female spline portion formed on an end of a sleeve 148 (FIG. 18) disposed around the intermediate portion of the input shaft 115*a* for rotational movement with respect to the input shaft 115*a,* thereby connecting the output disc 104 to the sleeve 148 for synchronous rotational movement. Further, in a condition that the male spline portion 146 is engaged by the female spline portion, the outer surface side large diameter portion 147 is closely fitted onto on an intermediate portion of the sleeve 148 nearer center than the male spline portion 146, so that a central axis of the sleeve 148 is aligned with a central axis of the output disc 104. Incidentally, an output gear 121*a* for taking out rotation of the output disc 104 is formed integrally with the sleeve 148 on the outer peripheral surface of the intermediate portion of the sleeve 148. The sleeve 148 is rotatably supported via a pair of ball bearings 142 of angular type inside of a partition plate 141 within a housing 143.

The needle bearing 116 in which plurality of needles 150 is rollingly held by a retainer 149 is disposed within the cylindrical surface portion 145. When assembled as the toroidal type continuously variable transmission, rolling surfaces of the needles 150 constituting the needle bearing 116 abut against the outer peripheral surface of the intermediate portion of the input shaft 115*a* acting as an inner race track. A lock groove 118 is formed between the inner surface side large diameter portion 144 and the cylindrical surface portion 145, and a stop ring 119 is locked within the lock groove 118, thereby preventing the needle bearing 116 from dropping the inside of the cylindrical surface portion 145 toward the inner surface side large diameter portion 144 (toward the left in FIGS. 16 and 17). Incidentally, engagement between the retainer 149 and an end edge of the female spline portion 146 prevents the needle bearing 116 from dropping the inside of the cylindrical surface portion 145 toward the inner surface side large diameter portion 144.

An inner diameter $R_{145}$ of the cylindrical surface portion 145 an inner diameter $R_{147}$ of the outer surface side large diameter portion 147 is selected to be greater than a diameter $D_{146}$ of a circumscribed circle of a groove bottom of the female spline portion 146 ($R_{145}>D_{146}$, $R_{147}>D_{146}$). Accordingly, recessed grooves constituting the female spline portion 146 can be formed in the inner peripheral surface of the through hole 117 efficiently by a broach working, thereby reducing the manufacturing cost of the output disc 104 having the female spline portion 146. Incidentally, a spline module of the female spline portion 146 is preferably one or two from the point that a thickness of the male spline portion formed on the end of the sleeve 148 is maintained to increase torque capacity at an engagement portion between the spline portions. The allowable torque at the spline engagement portion is determined in dependence upon the module, the number of teeth and lengths of the splines. Further, desirably, an inner diameter $R_{144}$ of the inner surface side large diameter portion 144 is selected to be greater than the inner diameter $R_{145}$ of the cylindrical surface portion 145 ($R_{144}>R_{145}$). By increasing the inner diameter $R_{144}$ of the inner surface side large diameter portion 144 in this way, the stop ring 119 can easily be locked within the lock groove 118. A cutting length (diameter of the $R_{145}$ portion) can be shortened, thereby reducing the cost.

Figure 18:
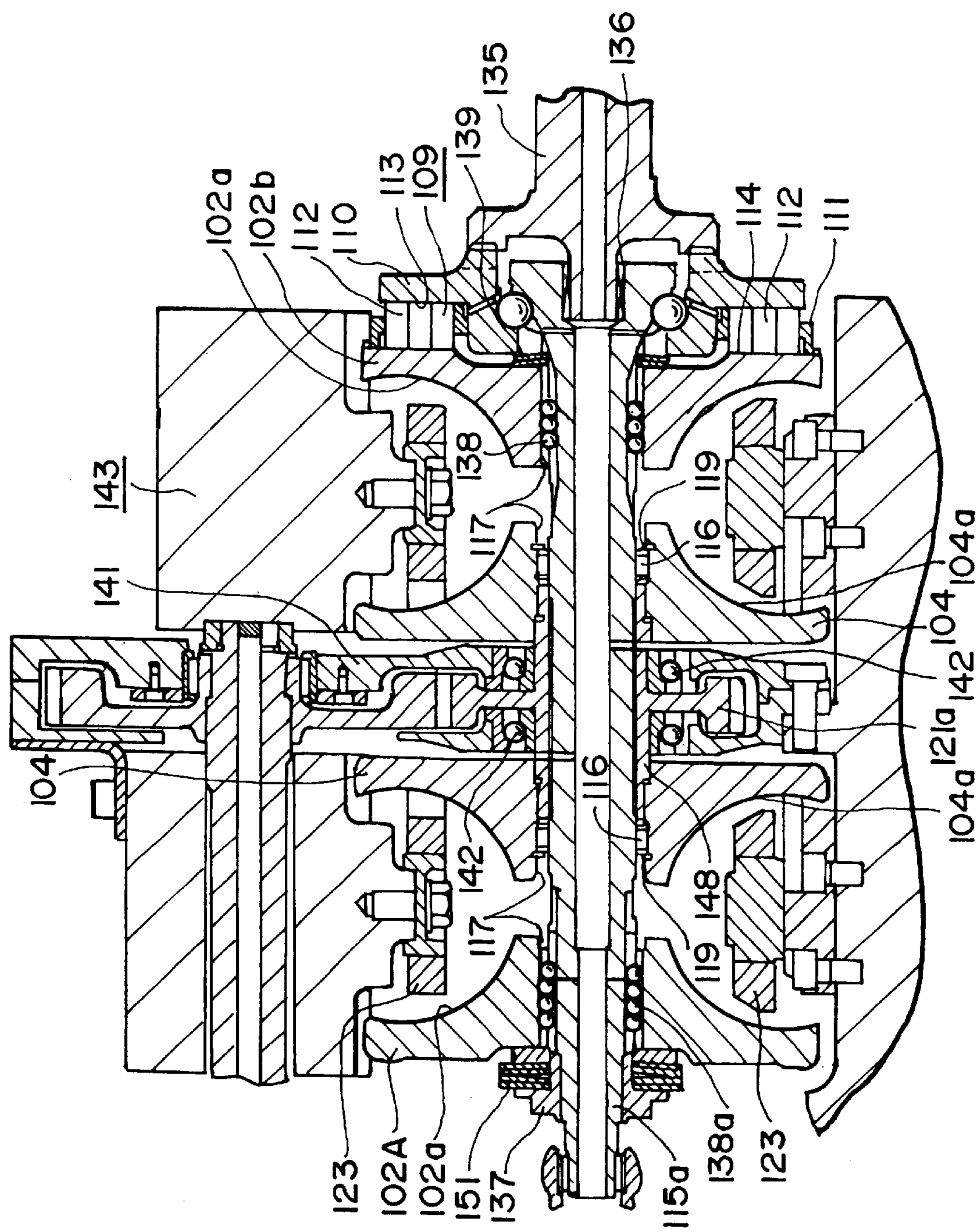
FIG. 18 is a sectional view showing a condition that the output disc is assembled to a toroidal type continuously variable transmission.

As shown in FIG. 18, the output disc 104 provided at its center with the through hole 117 having the above-mentioned configuration, the needle bearing 116 comprised of the retainer 149 and the needles 150, and the stop ring 119 are pre-assembled to a positional relation attained after the assembling of the toroidal type continuously variable transmission is completed, before these parts are assembled to the toroidal type continuously variable transmission. In a condition that these members 104, 149, 150, 119 are assembled as shown in FIG. 16, it is ascertained whether these constructural parts 104, 149, 150, 119 are operated correctly or not, before these constructural parts 104, 149, 150, 119 are incorporated into the housing 143 as shown in FIG. 18. After it is ascertained that these parts are operated correctly, the output disc unit is incorporated into the housing 143 together with other constructural parts, thereby completing the toroidal type continuously variable transmission. Accordingly, the positional relation between the constructural parts can be maintained with high accuracy to enhance efficiency and endurance of the toroidal type continuously variable transmission without troublesome operation such as disassembling and re-assembling of the toroidal type continuously variable transmission. Incidentally, in the condition that the constructural parts 104, 149, 150, 119 are assembled to obtain the output disc unit as shown in FIG. 16, surfaces of the constructural parts are coated by rust-inhibiting oil. Preferably, as the rust-inhibiting (preservative) oil, designated rust-inhibiting oil which does not deteriorate the traction oil even if the rust-inhibiting oil is mixed with the traction oil within the housing 143.

As shown in FIG. 18, in the condition that the constructural parts are incorporated into the housing 143 to obtain the toroidal type continuously variable transmission, two or three power rollers 108 (FIGS. 21 and 26) are interposed between the inner surfaces 104*a* of the output discs 104 and the inner surfaces of the input discs 102A, 102B. In case where the number of the power rollers 108 interposed between the inner surfaces 104*a,* 102*a* is two, when the power is transmitted from the input discs 102A, 102B to the output discs 104, the inner peripheral surface configurations of the through holes 117 formed in the output discs 104 at the centers thereof are elastically deformed in elliptical shapes. Regardless of such deformation, in order to prevent excessive load (edge load) from acting on ends of the rolling surfaces of the needles 150 constituting the needle bearing 116, preferably, needles having rolling surfaces subjected to great crowning are used as the needles 150.

Figure 19:
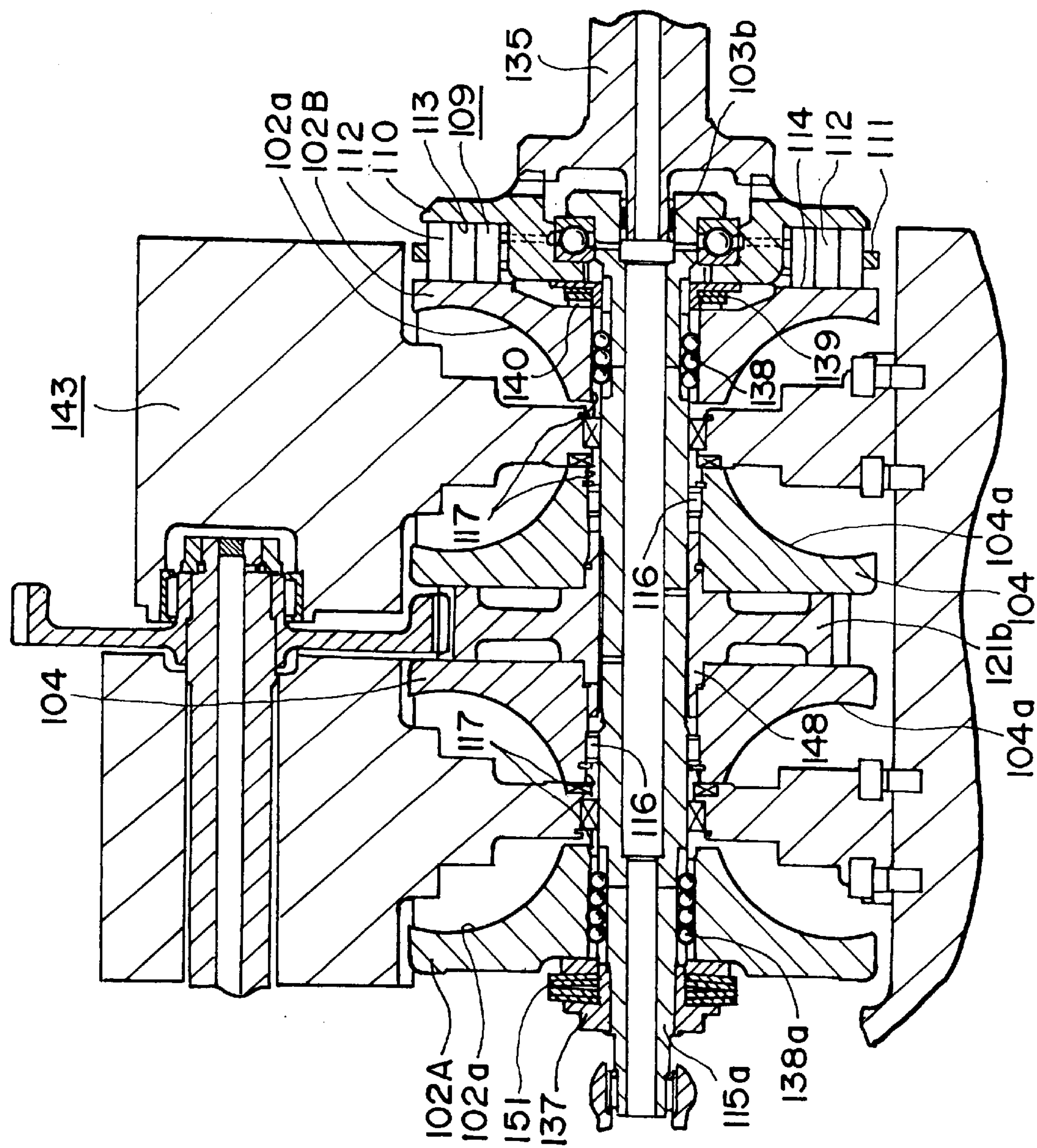
FIG. 19 is a sectional view similar to FIG. 18, showing a sixth embodiment of the present invention.

FIG. 19 shows a sixth embodiment of the present invention. In this embodiment, when the-power is transmitted from the input discs 102A, 102B to the output discs 104, deformation of the output discs 104 is suppressed to maintain the endurance of the output discs 104. That is to say, when the power is transmitted, the output discs 104 are subjected to great thrust load from two or three power rollers 108 (FIGS. 21 to 26). Although the output discs 104 are elastically deformed repeatedly by such thrust load, if an amount of elastic deformation is increased, it is difficult to ensure the endurance of the output discs 104. Particularly, when the toroidal type continuously variable transmission is operated under a speed reduction condition, the peripheral surfaces 108*a* of the power rollers 108 abut against outer peripheral areas of the inner surfaces 104*a* of the output discs 104. Regarding the thickness of the output discs 104 along the axial direction, the outer peripheral areas are thinnest, so that the outer peripheral areas are apt to be deformed greatly during the operation under the speed reduction condition.

Figure 26:
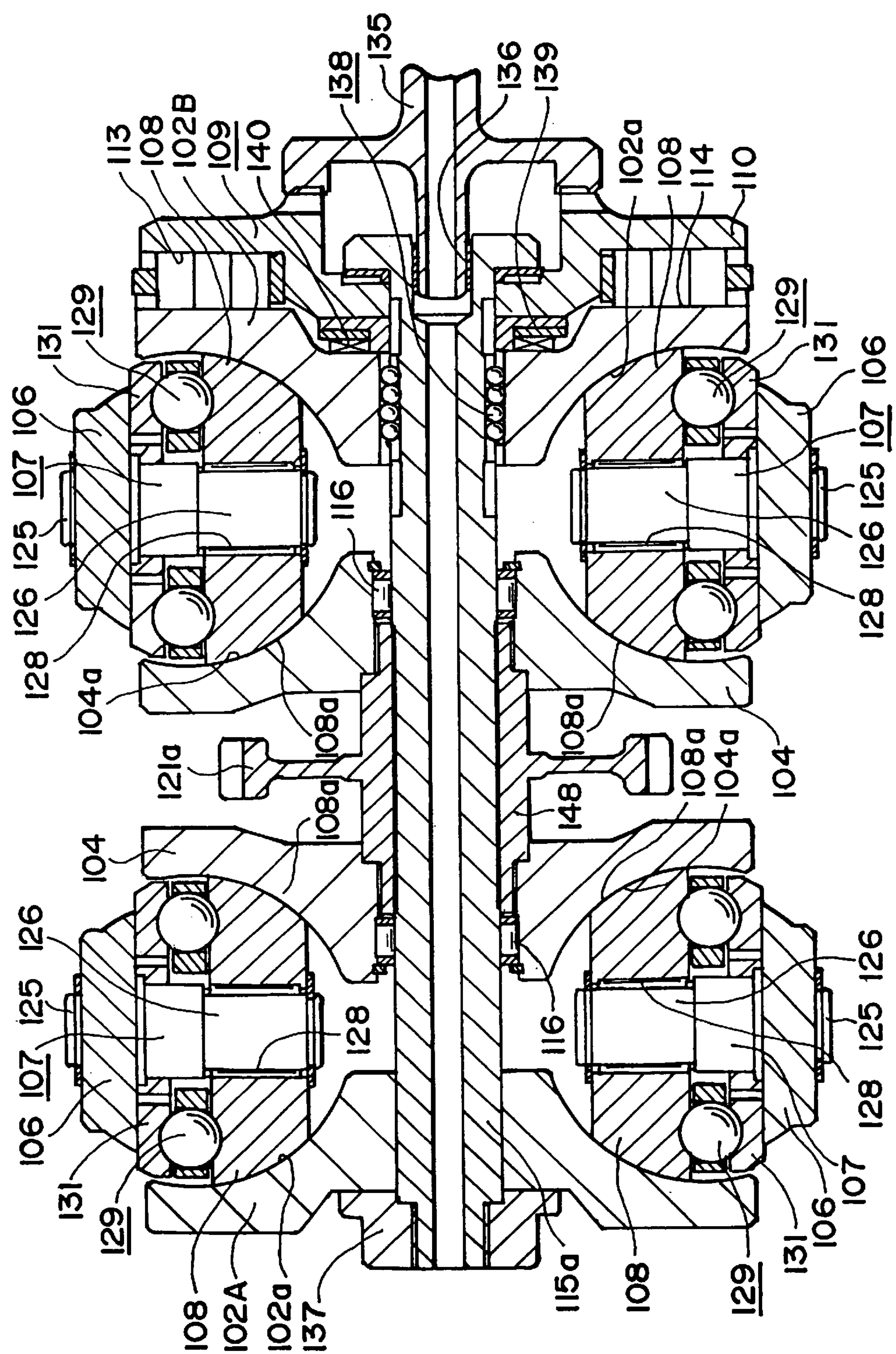
FIG. 26 is a partial sectional view showing a third example.

In the illustrated embodiment, as is in the construction shown in FIG. 26, the toroidal type continuously variable transmission is so constructed that a partition wall 141 (FIGS. 18 and 25) is not provided between the pair of output discs 104 and outer peripheral areas of both side surfaces of an output gear 121*b* provided on the outer peripheral surface of the intermediate portion of the sleeve 148 abut against outer peripheral areas of the outer surfaces of the output discs 104, so that elastic deformation of the outer peripheral areas of the output discs 104 is suppressed. That is to say, the outer and inner peripheral areas of the outer surfaces of the output discs 104 and the outer and inner peripheral areas of the side surfaces of the output gear 121*b* are situated in a single plane perpendicular to the input shaft 115*a* so that these areas abut against each other. Accordingly, not only inner diameter side areas of the outer surface of the output shafts 104 are backed up by the output gear 121*b*, but the thinnest areas (in the axial direction) (corresponding to bottoms of the arc-shaped inner surfaces 104*a*) of the output discs 104 are supported by the output gear 121*b*. Accordingly, even when the thickness of the output discs 104 are not increased particularly, during the operation of the toroidal type continuously variable transmission, the elastic deformation of the output discs 104 can be suppressed to ensure the endurance of the output discs 104. Therefore, weight of the toroidal type continuously variable transmission can be reduced and the endurance thereof can be maintained.

Figure 20:
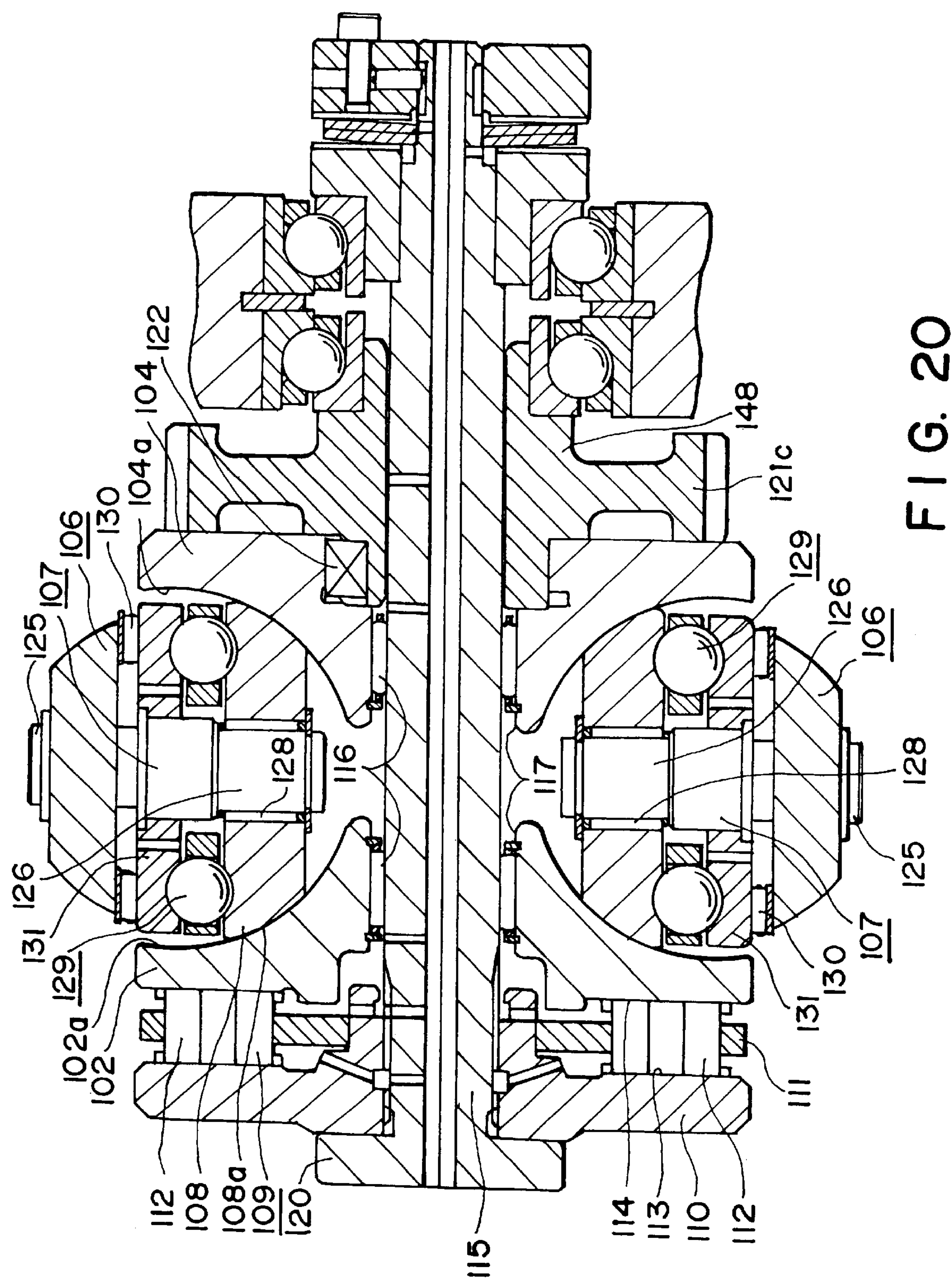
FIG. 20 is a sectional view similar to FIG. 18, showing a seventh embodiment of the present invention.

FIG. 20 shows a seventh embodiment of the present invention. Also in this embodiment, as is in the above-mentioned sixth embodiment, when the power is transmitted from the input disc 102 to the output disc 104, deformation of the output discs 104 is suppressed to maintain the endurance of the output discs 104. In case of the sixth embodiment, while an example that such arrangement is applied to the toroidal type continuously variable transmission of so-called double cavity type in which two input discs 102A, 102B and two output discs 104 are provided was explained, in this embodiment, such arrangement is applied to the toroidal type continuously variable transmission of so-called single cavity type in which one input disc 102 and one output disc 104 as shown in FIG. 23 are provided. Thus, in this embodiment, outer peripheral areas of an output gear 121*c* has wider portions, and one side surface of the outer peripheral area (left side surface in FIG. 20) abuts against a portion of the outer surface of the output disc 104 corresponding to a bottom of the arc-shaped inner surface 104*a*.

According to the output disc unit for the toroidal type continuously variable transmission of the present invention, since it is constructed as mentioned above, the cost of the toroidal type continuously variable transmission can be reduced by improving the assembling efficiency of the toroidal type continuously variable transmission.

What is claimed is:

1. A pre-assembled disc unit for use in assembling a toroidal type continuously variable transmission, said disc unit comprising:

a transmission disc having a substantially arcuately concave front-side surface and provided at a central portion with a through hole passing axially through said disc;

a radial rolling bearing disposed within said through hole; and a stop ring locked within a lock groove formed in an inner peripheral surface of said through hole and disposed so as to prevent said radical rolling bearing from escaping from said through hole;

said disc, said radial rolling bearing and said stop ring being pre-assembled substantially to a positional relation to be attained after incorporation into a toroidal type continuously variable transmission, thereby enabling evaluation of the pre-assembly prior to incorporation into the transmission.

2. A disc unit according to claim 1, wherein a cylindrical surface portion acting as an outer race track of said radial rolling bearing is provided at a first axially intermediate portion of said through hole, a female spline portion is provided on a second axially intermediate portion of said through hole disposed toward a back-side surface of said disc relative to said first intermediate portion, a front-side large diameter portion is provided at a front axial end portion of said through hole, a back-side large diameter portion is provided at a back axial end portion of said through hole, and inner diameters of said cylindrical surface portion and said back-side large diameter portion are greater than a diameter of a circumscribed circle at a groove bottom of said female spline portion.

* * * * *